US005891347A

United States Patent [19]

Matsumoto

[11] Patent Number: 5,891,347

[45] Date of Patent: Apr. 6, 1999

[54] CENTRIFUGAL FILTRATION METHOD AND APPARATUS THEREFOR

[75] Inventor: Takashi Matsumoto, Sakai, Japan

[73] Assignee: Matsumoto Machine Mfg. Co., Ltd., Japan

[21] Appl. No.: 782,256

[22] Filed: Jan. 14, 1997

[30] Foreign Application Priority Data

Jan. 17, 1996 [JP] Japan .................................... 8-005961
Oct. 17, 1996 [JP] Japan .................................... 8-274983

[51] Int. Cl.[6] ........................... B01D 33/06; B01D 35/18; B04B 3/00

[52] U.S. Cl. .......................... 210/770; 210/772; 210/781; 210/797; 210/808; 210/143; 210/175; 210/360.1; 210/369; 210/372; 210/380.1; 210/396; 210/402; 210/408; 210/416.1; 127/19; 34/58; 34/132; 34/315; 34/318; 134/10; 134/109

[58] Field of Search ................................ 127/19; 494/36, 494/60; 34/58, 132, 315, 318; 134/10, 109; 210/739, 741, 744, 770, 772, 774, 781, 791, 808, 86, 95, 143, 104, 144, 175, 198.1, 360.2, 372, 374, 373, 375, 380.1, 380.3, 384, 390, 402, 408, 416.1, 418

[56] References Cited

U.S. PATENT DOCUMENTS 5,460,717 10/1995 Grimwood et al. .................... 210/175

FOREIGN PATENT DOCUMENTS 60-28553 7/1985 Japan .
62-44982 9/1987 Japan .
7-20560 3/1995 Japan .

*Primary Examiner*—David A. Reifsnyder
*Attorney, Agent, or Firm*—Pollock, Vande Sande & Priddy

[57] ABSTRACT

Centrifugal filtration capable of improving recovery of crystal in a baskey. The basket is so arranged that a central axis thereof is inclined with respect to a horizontal direction to obliqely downwardly orientate a bottom wall of the basket. A crystal recovery auction pipe is arranged which includes a pivotally movable section pivotally moved in the basket, of which a distal end is advanced into crystal in the basket. Crystal in the basket is recovered by suction through the distal end of the suction pipe, which is ultimately displaced to a corner of the basket between a lowermost portion of a peripheral wall of the basket and a bottom wall thereof. This permits crystal collected to a lowermost section of the basket to be substantially recovered by suction through the suction pipe, to thereby improve crystal recovery.

10 Claims, 8 Drawing Sheets

CENTRIFUGAL FILTRATION METHOD AND APPARATUS THEREFOR

BACKGROUND OF THE INVENTION

This invention relates to a centrifugal filtration method and a centrifugal filtration apparatus therefor.

In a chemical plant, a solid-liquid separation step of separating slurry which is untreated liquid into a liquid fraction contained in the slurry and crystal is often practiced in manufacturing of a product. Also, a cleaning step of cleaning the crystal with cleaning liquid and a drying step of drying cleaned crystal are generally conducted subsequent to the solid-liquid separation step.

An apparatus for such solid-liquid separation is generally classified into two types. One of them is a filter-type filtration apparatus which is adapted to squeeze or press slurry to feed it to a filter, to thereby separate the slurry into a liquid fraction and crystal. The other type is a centrifugal filtration apparatus which is generally constructed so as to feed slurry to a basket rotated at a high speed to separate the slurry into a liquid fraction and crystal by centrifugal force.

The filter-type filtration apparatus causes crystal to be pressed during filtration, so that the crystal tends to take the form of blocks or agglomerates. This results in the crystal being densified in structure. Thus, the filter-type filtration apparatus substantially fails to permit cleaning liquid to be uniformly distributed in the crystal by penetration in a cleaning step, to thereby keep the crystal from being effectively cleaned.

On the contrary, the centrifugal filtration apparatus permits suitable voids to be formed in a structure of crystal while eliminating such squeezing or pressing of crystal as described above, resulting in cleaning liquid uniformly entering crystal to a degree sufficient to ensure satisfactory cleaning of the crystal in a short period of time, so that the crystal may be provided with increased quality.

Also, the filter-type filtration apparatus has the above-described disadvantage of rendering a structure of crystal densified, so that much time is required for drying of the crystal; whereas the centrifugal filtration apparatus prevents densification of crystal, so that the drying may be accomplished in a relatively short period of time.

Thus, the centrifugal filtration apparatus ensures effective and uniform cleaning of crystal and reduces a period of time required for the drying, therefore, crystal obtained is substantially decreased in impurity content and provided with high quality.

The centrifugal filtration apparatus, as described above, exhibits significant advantages over the filter-type filtration apparatus, however, it encounters a problem of rendering recovery of crystal obtained troublesome or difficult because crystal is formed in a cage-type basket. In particular, when the basket is arranged in a casing of the closed type in order to prevent inclusion of impurities in the crystal, satisfactory recovery of crystal obtained is rendered substantially impossible.

It would be considered that recovery of crystal from the basket of the centrifugal filtration apparatus is conveniently carried out by inserting a suction pipe connected to a vacuum suction unit into the basket to recover the crystal by suction through the suction pipe. Certainly, the suction pipe permits crystal to be recovered to a degree even when the basket is arranged in a closed-type casing.

Nevertheless, mere insertion of the suction pipe into the basket is insufficient to efficiently recover substantially all crystal in the basket, leading to remaining of crystal in the basket.

In view of the foregoing disadvantage, the inventors proposed a centrifugal filtration apparatus as disclosed in Japanese Patent Publication No. 28553/1985 (60-28553) and Japanese Patent Publication No. 44982/1987 (62-44982). The apparatus proposed is so constructed that a basket is formed on a bottom wall thereof with circumferentially extending grooves in which crystal deposited on an inner periphery of the basket is collected by drop, resulting in crystal scraped off in the grooves by a scraping unit being discharged by suction using a suction pipe. The centrifugal filtration apparatus enhances recovery of crystal, however, it fails to collect all crystal in the grooves, leading to some remaining of crystal in the casket.

Further, in manufacturing of fine chemicals such as pharmaceutical preparations or the like, it is required to prevent inclusion of impurities in crystal to the utmost. For this purpose, it is desired to carry out steps extending from a solid-liquid separation step to a drying step in the same container. When a centrifugal filtration apparatus is used to this end, it is desired that crystal is dried in a basket after a solid-liquid separation step and a cleaning step. Thus, as seen in Japanese Patent Publication No. 20560/1995 (7-20560), it would be considered that the basket is fed with heat to dry crystal after completion of the cleaning step. Unfortunately, any conventional centrifugal filtration apparatus is not constructed so as to ensure that mere feed of heat to the basket permits crystal to be efficiently dried.

SUMMARY OF THE INVENTION

The present invention has been made in view of the foregoing disadvantage of the prior art.

Accordingly, it is an object of the present invention to provide a centrifugal filtration method which is capable of increasing recovery of crystal as compared with the prior art.

It is another object of the present invention to provide a centrifugal filtration method which is capable of efficiently carrying out steps extending from a solid-liquid separation step to a drying step in the same basket without deteriorating quality of crystal.

It is a further object of the present invention to provide a centrifugal filtration apparatus which is capable of being effectively applied to practicing of the centrifugal filtration method exhibiting the above-described objects.

In accordance with one aspect of the present invention, a centrifugal filtration method is provided which is adapted to separate slurry into a liquid fraction and crystal by centrifugal force. The method includes a solid-liquid separation step of subjecting slurry to centrifugal filtration by means of a centrifugal filtration apparatus to separate the slurry into a liquid fraction and crystal. The centrifugal filtration apparatus includes a basket constructed of a cylindrical peripheral wall formed with a plurality of through-holes, a bottom wall arranged so as to close one end of the peripheral wall defined in an axial direction thereof and an annular end wall arranged so as to be projected inwardly in a radial direction of the peripheral wall from an inner periphery of the other end of the peripheral wall defined in the axial direction, as well as a rotation drive unit for rotating the basket. The crystal is deposited on an inner peripheral surface of the basket during the solid-liquid separation step. The method also includes a crystal scraping step of scraping off crystal deposited on the inner peripheral surface of the basket and a crystal recovery step of recovering crystal scraped off from the inner peripheral surface of the basket by suction through a crystal recovery suction pipe inserted into the basket. The crystal recovery step is carried out in a manner to advance a forward end of the crystal recovery suction pipe into crystal to suck crystal and concurrently displace the forward end of the suction pipe to a corner of the basket between a lowermost portion of the peripheral wall of the basket and the bottom wall of the basket while keeping a central axis of the basket inclined by a predetermined angle with respect to a horizontal direction to orientate the bottom wall of the basket in an oblique and downward direction.

The above-described arrangement of the basket in a manner to keep the central axis of the basket inclined with respect to the horizontal direction permits crystal scraped off to be ultimately collected at the lowermost portion of the basket or the corner of the basket between the lowermost portion of the peripheral wall of the basket and the bottom wall of the basket. Thus, when the forward end of the crystal recovery suction pipe is oriented toward the corner, substantially all crystal can be recovered by suction with increased efficiency.

The method thus constructed is effective when the solid-liquid separation step, the cleaning step of feeding cleaning liquid to the basket to clean crystal, the crystal scraping step of scraping off crystal deposited on the inner peripheral surface of the basket therefrom while rotating the basket at a low speed, the drying step of feeding heat to the basket to dry crystal while rotating the basket, and the crystal recovery step to recovering dried crystal by suction through the crystal recovery suction pipe inserted into the basket are practiced while keeping the casing tightly closed.

In this instance, the drying is carried out while repeatedly turning over the crystal in the basket.

Thus, the drying step executed while rotating the basket to repeatedly turn over crystal permits crystal in the basket to be uniformly exposed to heat, so that crystal may be dried in a short period of time.

Recovery of crystal after the drying step as described above permits crystal to be provided with highly increased free-flowing properties, so that substantially all crystal may be collected at the corner of the basket between the lowermost portion of the peripheral wall of the basket and the bottom wall of the basket. This results in crystal recovery being accomplished with increased efficiency.

In the drying step described above, it is preferable to reduce a pressure in each of the casing and basket by means of a pressure reducing unit such as a vacuum pump or the like. Drying of crystal while reducing a pressure in the casing and basket permits heat energy fed to the basket to be reduced, leading to energy savings. Also, this permits a temperature of crystal to be kept low during the drying step, to thereby substantially prevent thermal deterioration of crystal.

Further, the above-described pressure reduction renders an interior of the basket free from any oxygen or substantially reduces a content of oxygen in the basket, to thereby effectively prevent oxidation of crystal.

Moreover, the pressure reduction significantly reduces both a content of oxygen in the basket and thermal energy fed to the basket, to thereby fully eliminate likelihood of explosion of inherently flammable crystal during the drying step.

In accordance with another aspect of the present invention, a centrifugal filtration apparatus suitably applied to practicing of the above- described method of the present invention is provided. The centrifugal filtration apparatus includes a basket including a cylindrical peripheral wall formed with a plurality of through-holes, a bottom wall arranged so as to close one end of the peripheral wall defined in an axial direction thereof and an annular end wall arranged so as to be projected inwardly in a radial direction of the peripheral wall from an inner periphery of the other end of the peripheral wall defined in the axial direction and supported in a manner to be rotatable, a rotation drive unit for rotating the basket, a slurry feed unit for feeding slurry to the basket, a crystal scraping unit for scraping off crystal deposited on an inner peripheral surface of the peripheral wall of said basket, and a crystal recovery unit including a crystal recovery suction pipe inserted into said basket. The basket is arranged in a manner to keep a central axis thereof inclined to obliquely downwardly incline the bottom wall.

The crystal recovery suction pipe includes a pivotally movable section pivotally moved in the basket and is so arranged that the pivotally movable section is displaced at a forward end thereof between a last suction position defined in proximity to a corner of the basket between a lowermost portion of the peripheral wall of the basket kept inclined and the bottom wall of the basket and a retreat position at which the forward end is retreated inwardly of a position corresponding to an inner periphery of an opening of the basket.

Alternatively, in place of keeping the basket constantly inclined, a basket inclination angle adjustment mechanism may be arranged for adjusting an angle of inclination of the central axis of the basket with respect to a horizontal direction so as to incline the central axis of the basket by a predetermined angle with respect to the horizontal direction to orientate the bottom wall of the basket in an oblique and downward direction at least during the crystal recovery step.

In a preferred embodiment of the present invention, the basket is arranged in a casing constructed into a tightly closable structure.

BRIEF DESCRIPTION OF THE DRAWINGS

These and other objects and many of the attendant advantages of the present invention will be readily appreciated as the same becomes better understood by reference to the following detailed description when considered in connection with the a accompanying drawings; wherein.

DETAILED DESCRIPTION OF THE PREFERRED EMBODIMENTS

Now, the present invention will be described hereinafter with reference to the accompanying drawings.

Figure 1:
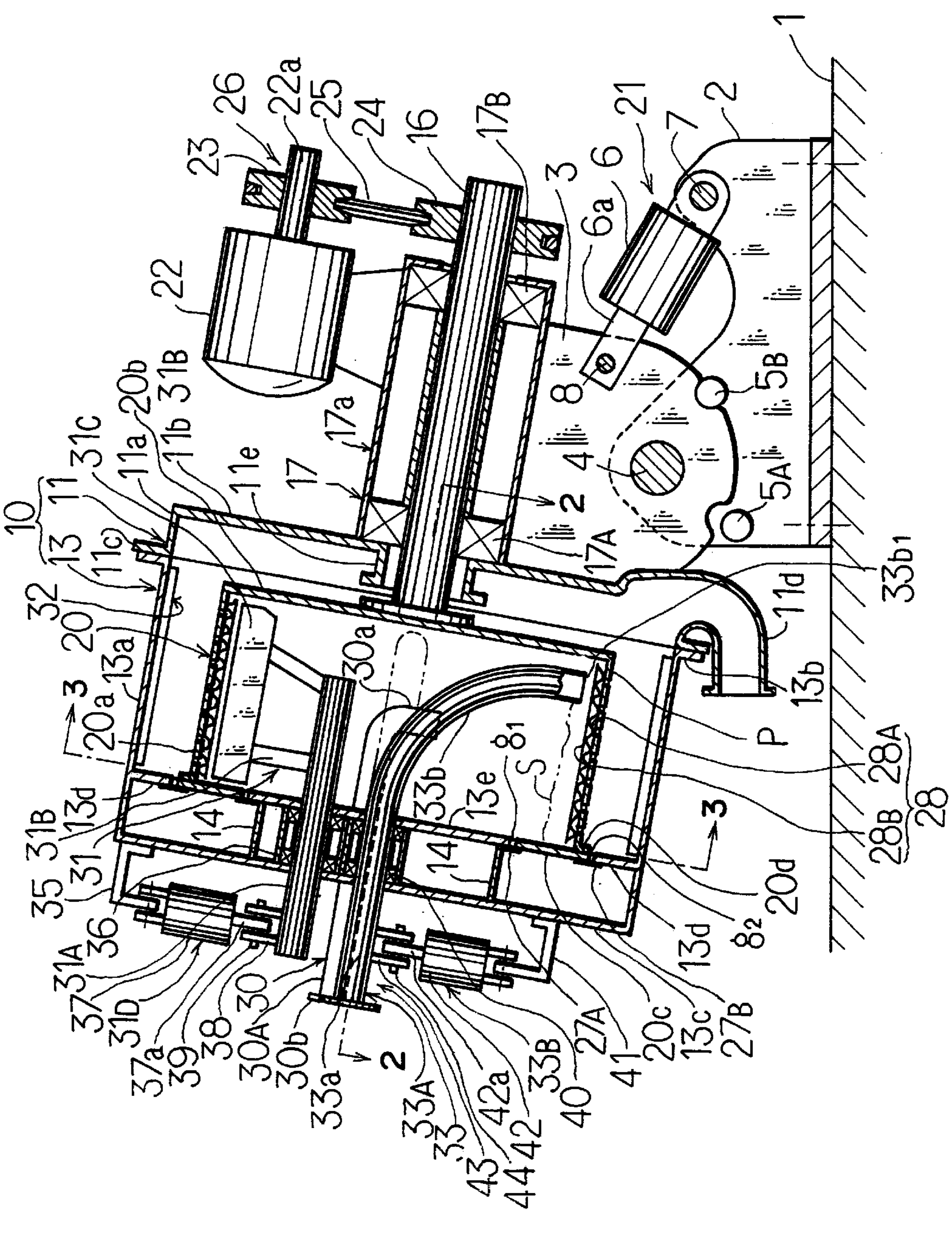
FIG. 1 is a vertical sectional view showing an embodiment of a centrifugal filtration apparatus according to the invention.

Referring first to FIGS. 1 to 4, an embodiment of a centrifugal filtration apparatus according to the present invention is illustrated. In FIG. 1, reference numeral 1 designates an installation base, 2 is a base frame fixed on the installation base 1 by means of bolts and the like, and 3 is a movable frame pivotally supported on the base frame 2 through a shaft 4. The base frame 2 is provided thereon with stoppers 5A and 5B, which are abutted against a part of the movable frame 3 to regulate a range of pivotal movement of the movable frame 3, so that an angle of pivotal movement of the movable frame 3 is limited to an angular range between 10 degrees and 30 degrees. In the illustrated embodiment, the base frame 2 and movable frame 3 are connected to a rear end of a hydraulic cylinder 6 and a distal end of a piston rod 6*a* of the cylinder 6 through pins 7 and 8, respectively, so that actuation of the hydraulic cylinder 6 permits the movable Frame 3 to be pivotally moved from a first position at which the movable frame 3 is abutted against the stopper 5A to a second position at which it is abutted against the stopper 5B. A releasable lock means (not shown) is arranged for releasably locking the movable frame 3 on the base frame 2 while holding the movable frame 3 at each of the first and second positions, so that locking of the movable frame by the lock means permits the movable frame 3 to be firmly coupled to the base frame 2.

The movable frame 3 has a casing 10 supported thereon. The casing 10 includes a casing base 11 and a casing cover 13 openably connected to the casing base 11 through a hinge 12 (FIGS. 2 and 4).

The casing base 11 includes a peripheral wall 11*a* formed into a cylindrical shape, a bottom wall 11*b* arranged so as to close one end of the peripheral wall 11*a* defined in an axial direction thereof, an outer flange 11*c* formed on the other end of the peripheral wall 11*a* in the axial direction, and a drainage pipe connection lid of an L-shape connected at one end to both peripheral wall 11*a* and bottom wall 11*b* so as to communicate with an interior of the casing base 11, and a cylindrical portion 11*e* arranged on a peripheral edge of a through-hole formed at a center of the bottom wall 11*b* so as to extend inwardly of the casing base 11. The bottom wall 11*b* is securely mounted on the movable frame 3 and the drainage pipe connection 11*d* has a drainage pipe (not shown) connected thereto.

Figure 4:
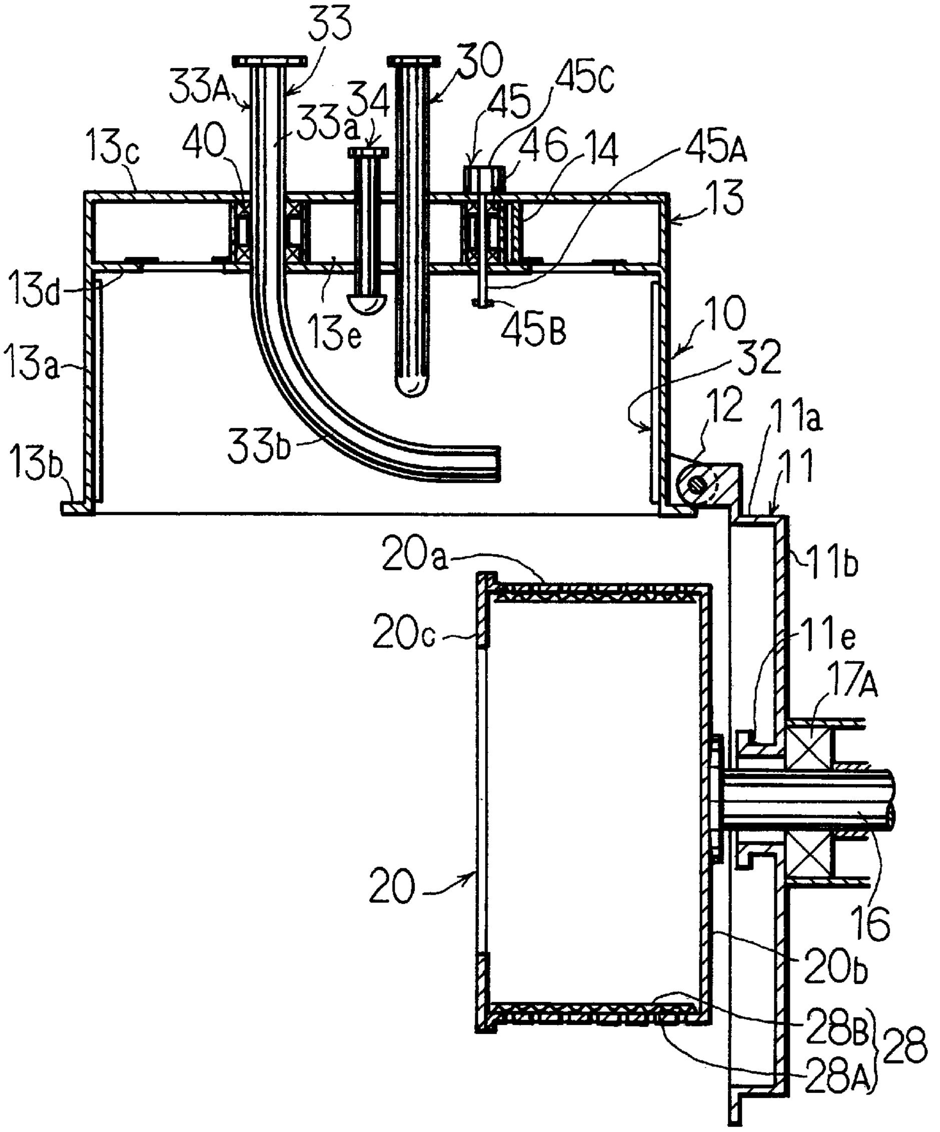
FIG. 4 is a sectional view of the centrifugal filtration apparatus shown in FIG. 1, wherein a cover for a casing is open.

The casing cover 13, as shown in FIG. 4 as well as FIG. 1, includes cylindrical peripheral wall 13*a* adapted to be aligned with the peripheral wail 115 of the casino base 1, an outer flange 13*b* formed on the one end of the peripheral wall 13*a* defined in she axial direction thereof, an end wall 13*c* arranged so as to close the other end of the peripheral wall 13*a* in the axial direction, an inner collar 13*d* formed on an inner periphery of the peripheral wall 13*a* while being positioned inwardly of the end wall 13*c*, and a lid plate 13*e* arranged concentrically with the inner collar 13*d* while being positioned inside an inner periphery of the inner collar 13*d* in a radial direction thereof and connected to the end wall 13*c* by means of a connection member 14.

Figure 2:
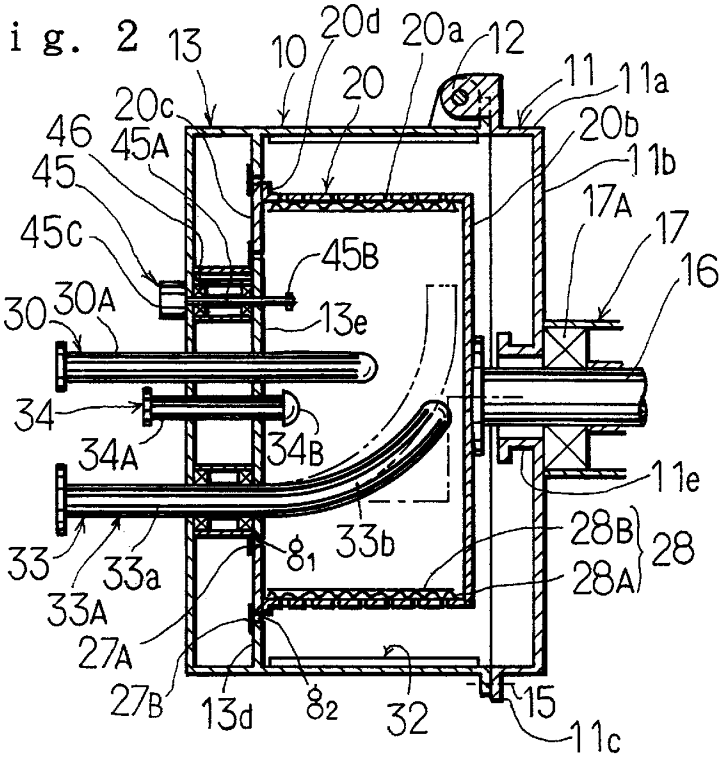
FIG. 2 is a sectional view taken along line 2—2 of FIG. 1, which shows an essential part of the centrifugal filtration apparatus of FIG. 1.

The casing cover 13 is constructed so as to be pivotally moved about the hinge 12 between a closed position at which the peripheral wall 13*a* of the casing cover 13 is aligned with the peripheral wall 11*a* of the casing base 11 to abut the flange 13*b* against the flange 11*c* as shown in FIGS. 1 and 2 and an open position at which a central axis of the peripheral wall 13*a* of the cover 13 is rendered perpendicular to a central axis of the peripheral wall 11*a* of the casing base 11.

A packing (not shown) is arranged between the flange 13*b* of the casing cover 13 and the flange 11*c* of the casing base 11, so that when the flange 13*b* is fastened to the flange 11*c* using any suitable fastening means 15 such as bolts or the like while holding the casing cover 13 at the closed position, a joint section between the flange 13*b* of the casing cover 13 and the flange 11*c* of the casing base 11 may be provided with both airtightness and liquid-tightness.

The casing 10 is mounted on the movable frame 3 so that a central axis of the casing 10 (a central axis of the peripheral wall of each of the casing base 11 and casing cover 13) is orientated in a horizontal direction when the movable frame 3 is at the first position at which it is abutted against the stopper 5A and is inclined by an angle of 10 to 30 degrees from the horizontal direction to obliquely downwardly orientate the bottom wall 11*b* of the casing base 11 when the movable frame 3 is at the second position at which it is abutted against the stopper 5B.

The movable frame 3 is mounted thereon with a bearing unit 17 for supporting therein a revolving shaft 6 coupled to a basket described hereinafter while being rendered coaxial with the casing 10.

The bearing 17 includes a cylindrical housing 17*a* and a pair of ball bearings 17A and 17B arranged in the housing 17*a* in a manner to be spaced from each other at an interval in an axial direction thereof The revolving shaft 16 is rotatably supported in the housing 17*a* while extending through an inner ring of each of the ball bearings 17A and 17B. The revolving shaft 16 is introduced at one end thereof through the cylindrical portion 11*e* of the bottom wall 11*b* of the casing base 11 into the casing 10 and has the other end led out of the bearing unit 17.

The casing 10 is provided therein with a basket 20 in a rotatable manner. The basket 20, as shown in FIGS. 1, 2 and 4, includes a peripheral wall 20*a*, a bottom wall 20*b* arranged so as to close one end of the peripheral wall 20*a* defined in an axial direction thereof, and an annular end wall 20*c* arranged so as to be projected radially inwardly of an inner periphery of the other end of the peripheral wall 20*a* in the axial direction. In the illustrated embodiment, the peripheral wall 20*a* is mounted on the other end thereof with an outer flange 20*d*. The end wall 20*c* is constructed of an annular plate detachably mounted on the outer flange 20*d* by means of bolts or the like. The peripheral wall 20*a* of the basket 20 is formed with a number of through-holes for permeation while being uniformly distributed over the whole peripheral wall 20*a*.

The basket 20 is arranged in the casing 10 while aligning a central axis thereof with that of each of the casing 10 and bearing unit 17 and rendering the bottom wall 20*b* opposite to the casing base 11. The revolving shaft 16 is fixedly connected at one end thereof to the an outer surface of a center of the bottom wall 20*b*.

The basket 20 is arranged so as to be coaxial with the casing 10 as described above, so that the central axis of the basket is orientated in the horizontal direction when the movable frame 3 is at the first position at which it is abutted against the stopper 5 and is inclined by an angle of 10 to 30 degrees from the horizontal direction to obliquely downwardly inline the bottom wall 20*b* when the movable frame 3 is at the second position at which it is abutted against stopper 6.

In the illustrated embodiment, the movable frame 3, hydraulic cylinder 6, stoppers 5A and 5B, and lock means (not shown) for locking the movable frame 3 to each of the first and second positions cooperate with each other to provide a basket inclination angle adjustment mechanism 21.

The bearing unit 17 is mounted thereon with a motor 22 acting as a drive source for rotating the basket 20. The motor 22 includes a revolving shaft 22*a*, on which a pulley 22 is mounted. Also, the other end of the revolving shaft 16 led out of the bearing unit 17 is mounted thereon with a pulley 24 and a belt 25 is arranged so as to extend through the pulleys 23 and 24, so that the revolving shaft 16 and basket 20 may be rotated by the motor 22.

In the illustrated embodiment, the motor 22, pulleys 23 and 24, and belt 25 cooperate with each other to constitute a rotation drive unit 26 for rotating the revolving shaft 16 and basket 20.

The lid plate 13*e* of the casing cover 13, as shown in FIG. 1, is arranged so as to be loosely fitted in the inner periphery of the end wall 20*c* of the basket 20 when the casing cover 13 is moved to the closed position. The lid plate 13*e* and end wall 20*c* are constructed so as to define a microgap g1 between an outer periphery of the lid plate 13*e* and the inner periphery of the end wall 20*c* to ensure smooth rotation of the basket 20. Also, the inner collar 13*d* of the casing cover 13 is arranged so as to externally surround an outer periphery of the end wall 20*c* of the basket 20 when the casing cover 13 is moved to the closed position. The inner collar 13*d* and end wall 20*c* are constructed so as to define a microgap g2 between an inner periphery of the inner collar 13*d* and an outer periphery of the end wall 20*c*.

In order to prevent leakage of crystal, mist of a liquid fraction and the like from the basket through the gap g1 between the end wall 20*c* of the basket 20 and the lid plate 13*e* of the casing cover 13, the lid plate 13*e* is securely mounted on a portion thereof rather in proximity to an outer periphery thereof with an annular lid member 27A made of a rubber material, which is arranged so as to be lightly slidably contacted at a portion thereof rather in proximity o an inner periphery thereof with a portion of the basket 20 rather in proximity to an inner periphery of the end wall 20*c*.

Likewise, in order to prevent leakage of a liquid fraction through the microgap g2 between the outer periphery of the end wall 20*c* of the basket 20 and the inner collar 13*d* of the casing cover 13, the casing cover 13 is securely mounted on a portion thereof rather in proximity to an inner periphery of the inner collar 13*d* with an annular lid member 27B made of a rubber material, which is arranged so as to be lightly slidably contacted at a portion thereof rather in proximity to an inner periphery thereof with the outer flange 20*d* of the basket 20.

The peripheral wall 20*a* of the basket 20 is fitted in an inner periphery thereof with a filter 28, which includes a wire net 28A formed into a cylindrical shape and a cylindrical perforated plate 28B arranged along an inner periphery of the wire net 28A and is fixedly mounted in the inner periphery of the basket through any suitable fixing means (not shown). Mounting and dismounting of the filter 28 with respect to the basket 20 are carried out while keeping the end wall 20*c* of the basket released therefrom. The perforated plate 28B is preferably made by forming a corrosion-resistant metal sheet such as stainless steel or the like with a number of pores by laser processing.

Figure 3:
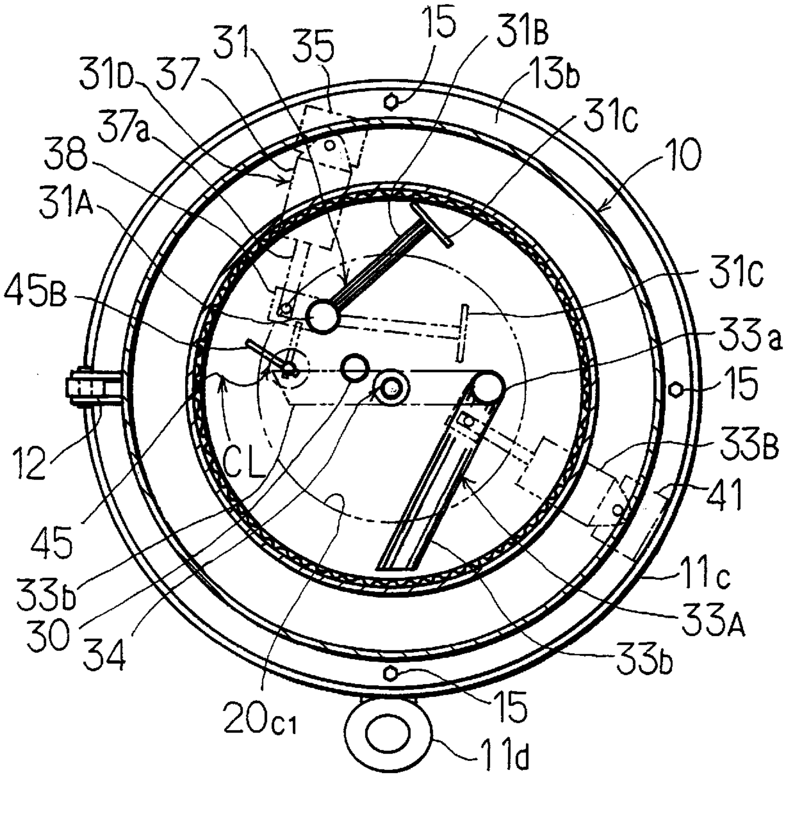
FIG. 3 is a sectional view taken along line 3—3 of FIG. 1.

The casing cover 13 is mounted with a slurry feed unit 30 for feeding slurry to the basket 20, a crystal scraping unit 31 for scraping crystal formed or deposited on an inner periphery of the peripheral wall 20*a* of the basket, a heating unit 32 for feeding heat to the basket to dry crystal in the basket, a crystal recovery unit 33 for recovering crystal formed in the basket, and a cleaning liquid feed unit 34 (FIGS. 2 and 3).

The slurry feed unit 30 includes a liquid feed pipe 30A arranged so as to extend through the end wall 13*c* and lid plate 13*e* of the casing cover 13 in an airtight and liquid-tight manner. The liquid feed pipe 30A has an end 30*a* positioned in the basket 20 and bent in a direction toward the peripheral wall 20*a* of the basket, as well as an end 30*b* positioned outside the casing 10. The end 30*b* of the liquid feedpipe 30A is connected through a solenoid pipe and a piping (not shown) to a slurry feed pump, or tank. Thus, the liquid feed pipe 30A and the solenoid valve (not shown) connected thereto cooperate together to provide the above-described slurry feed unit 30 for feeding slurry to (he basket 20.

The crystal scraping unit 31 includes a drive shaft 31A inserted into the basket 20 through the end wall 13*c* and lid plate 13*e* of the casing cover 13 and rotatably supported by a bearing 36, a scraping blade 31C mounted on the drive shaft 31B through an arm 31B and pivotally moved between an advance limit position at which the scraping blade approaches the peripheral wall 20*a* of the basket with rotation of the drive shaft 31A and a retreat position at which it is retreated inwardly in a radial direction thereof from a position corresponding to an inner periphery of an end wall 30*c* of the basket, and a scraping blade drive unit 31D for driving the drive shaft 31A to pivotally move the scraping blade 31A. The advance limit position is a position indicated by solid lines in FIG. 3, at which the scraping blade 31C is kept from being contacted with the filter 28 and the retreat position is indicated by dashed lines in FIG. 3. The scraping blade drive unit 31D includes a support 35 fixed on the end wall 13*c* of the casing cover 13, a hydraulic cylinder 37 pivotally supported on the support 35 and a pivotally movable arm 38 fixed at one end thereof on the drive shaft 31A, wherein the hydraulic cylinder 37 has a piston rod 37*a* connected to the pivotally movable arm 38 through a shaft 39.

During feeding of slurry to the basket 20 by rotation of the basket 20 or during liquid removal by high-speed rotation of the basket 20, the piston rod 37*a* of the hydraulic cylinder 37 is kept retreated, resulting in the scraping blade 31C being held at the retreat position indicated at dashed lines in FIG. 3. When crystal deposited on the inner periphery of the peripheral wall 20*a* of the basket is to be scraped, the hydraulic cylinder 37 is actuated to advance the piston rod 37*a*, so that the scraping blade 31C is permitted to gradually advance into the crystal. The scraping blade 31C is permitted to finally advance to the advance limit position indicated by solid lines in FIG. 3.

The heating unit 32 is not limited to any specific construction so long as it can feed heat to the basket. In the illustrated embodiment, the heating unit 32 is constituted by a heater mounted on an inner periphery of the peripheral wall 13*a* of the casing cover 13. The heater for the heating unit 32 may be constructed so as to permit heated fluid to flow through a radiation pipe equipped with radiation fins exhibiting sufficient resistance to corrosion by a liquid fraction separated by filtration. Alternatively, it may comprise an electric heater covered with a protective coating sufficient to exhibit corrosion-resistance to the liquid fraction and prevent the liquid fraction from deteriorating electric insulation of the heater.

The crystal recovery unit 33 includes a suction pipe 33A for crystal recovery and a suction pipe drive unit 33B for actuating the suction pipe 33B. The suction pipe 33A includes a straight pipe section 33*a* arranged so as to extend in parallel to the axis of the basket 20 and extend through the casing cover 13 at a position biased from the central axis of the basket 20 and rotatably supported by a bearing 40, as well as a pivotally movable section 33*b* which has a rearward end connected to an end of the straight pipe section 33*a* on a side of the basket and a forward end 33*b*1 curved so as to be directed toward the peripheral wall 20*a* of the basket 20 and is pivotally moved in the basket with rotation of the straight pipe section 33*a*. The straight pipe section 33*a* and pivotally movable section 33*b* may be formed integrally with each other. The suction pipe drive unit 33B includes a support 41 fixed on the end wall 13*c* of the casing cover 13, a hydraulic cylinder 42 pivotally supported at an end thereof on the support 41 and a pivotally movable arm 43 fixed at one end thereof to the straight pipe section 33*a* of the crystal recovery suction pipe 33A, wherein the hydraulic cylinder 42 includes a piston rod 42*a* which is connected at a distal end thereof to the pivotally movable arm 43 through a shaft 44. The crystal recovery suction pipe 33A is connected to a vacuum suction unit (not shown).

The pivotally movable section 33*b* of the crystal recovery suction pipe 33A is arranged so as to be pivotally moved between a last suction position and a retreat position. The last suction 33*b*1 approaches a corner P of the basket 20 between a lowermost portion of the peripheral wall 20*a* of the basket 20 (or more precisely, a lowermost portion of an inner peripheral surface of the filter 28) and the bottom wall 20*b* thereof as indicated at solid lines in FIGS. 1 to 3 while being kept in proximity to the inner surface of the bottom wall 20*b* of the basket 20. The retreat position is defined to be a position at which the forward end 33*b* 1 is orientated in a substantially horizontal direction along a radial direction of the basket as indicated at dashed lines in FIGS. 1 to 3. Thus, the pivotally movable section 33*b* is formed into a configuration and a length sufficient to ensure that when the pivotally movable section 33*b* reaches the last suction position, the forward end 33*b*1 of the pivotal movable section is rendered approaching the corner P between the lowermost portion of the peripheral wall 20*a* of the basket 20 (the lowermost portion of the inner peripheral surface of the filter 28) and the bottom wall 20*b*; whereas when it reaches the retreat position, the forward end 33*b*1 is permitted to be retreated inside from the position corresponding to the inner periphery of the end wall 20*c* of the basket.

During feeding of slurry to the basket by rotation of the basket 20 or during liquid removal by high-speed rotation of the basket 20, the piston rod 42*a* of the hydraulic cylinder 42 is kept advancing, so that the pivotally movable section 33*b* of the suction pipe 33A is held at the retreat position indicated at the dashed lines in FIGS. 1 to 3. For the purpose of recovering crystal in the basket, the piston rod 42*a* of the hydraulic cylinder 42 is retreated, resulting in the pivotally movable section 33*b* being pivotally moved to the last suction position.

The cleaning liquid feed unit 34, as shown in FIG. 2, includes a clearing liquid feed pipe 34A inserted into the basket while extending through the end wall 13*c* and lid plate 13*e* of the casing cover 13 in an airtight and liquid-tight manner, as well as an injection nozzle 34B mounted on an end of the cleaning liquid feed pipe 34A positioned in the basket 30. The cleaning liquid Feed pipe 34A is connected at an end thereof positioned outside the casing to a cleaning liquid (normally water) feed source such as a pump, a tank or the like through a solenoid valve and a predetermined piping (not shown. Thus, the cleaning liquid feed pipe 34A, nozzle 34B and solenoid valve (not shown) cooperate together to provide the cleaning liquid feed unit 34.

The end wall 13*c* of the casing cover 13 is mounted thereon with a liquid level detector 45 for detecting a level of slurry formed in the basket 20. The liquid level detector 45 includes a revolving shaft 45A inserted into the basket 20 while extending the end wall 13*c* and lid plate 13*e* of the casing cover and rotatably supported by a bearing 46 arranged between the end wall 13*c* of the casing cover and the lid plate 13*e* thereof, as well as a detection arm 45B mounted on an end of the revolving shaft 45A positioned in the basket and a sensor 45C mounted on an outer surface of the end wall 13*c* of the casing cover for generating a detection signal proportional to an angle of rotation of the revolving shaft 45A. The detection arm 45B, as indicated at solid lines in FIG. 3, is arranged so as to be pivotally movable between an advance position and a retreat position. The advance position is defined to be a position at which a forward end of the detection arm 45B advances to a location deviated outwardly in a radial direction of the basket from a position corresponding to an inner peripheral section 20*c*1 of the end wall 20*c* of the basket, to thereby be inclined rearwardly in a direction of rotation of the basket (or a direction indicated by an arrow CL in FIG. 3) based on the radial direction of the basket. The retreat position is defined to be a position at which the forward end is retreated inwardly in the radial direction of the basket from the position corresponding to the inner peripheral section 20*c* 1 of the end wall 20*c* of the basket. The sensor 45C is provided therein with a spring for forcing the detection arm 45B toward the advance position, so that the detection arm 45B is forcibly pivotally moved toward the advance position during detect!on of the level. Also, the sensor 45C is provided with a lock means for holding the detection arm 45B at the retreat position, to thereby permit the detection arm 43B to be held at the retreat position against urging force of the spring when the casing cover is open.

Slurry fed to the basket 20 is pressed against the inner peripheral surface of the peripheral wall of the basket by centrifugal force, to thereby form a liquid layer on the inner peripheral surface of the basket. The detection arm 45B of the liquid level detector 45 is held at the advance position while a liquid level of the liquid layer thus formed on the inner peripheral surface of the basket 20 is low, so that the sensor 45C is kept from generating a detection signal. An increase in liquid level of the slurry in the basket causes a surface of the liquid to be contacted with the detection arm 45B. Contact of the liquid surface with the detection arm 45B causes the detection arm 45B to be repeatedly repelled by the liquid surface, to thereby be pivotally moved to the retreat position and then returned toward the liquid surface by urging force of the spring. This results in the detection arm 45B vibrating. A center of vibration of the detection arm 45B is moved toward the retreat position with an increase in liquid level. The sensor 45C generates a detection signal proportional to the magnitude or degree of pivotal movement of the detection arm 45B toward the retreat position, so that vibration of the detection arm 45B causes the sensor 45C to generate a detection signal of an oscillatory wave form corresponding to vibration of the detection arm. A level of a center of the oscillatory wave form is increased with an increase in displacement of the detection arm toward the retreat position or an increase in liquid level of the slurry, therefore, an average value of the detection signal generated from the sensor 45C is increased in proportion to an increase in liquid level. Thus, the liquid level can be found from an average value of the output of the sensor 45C.

In the illustrated embodiment, it is desirable that a glass window (not shown) for monitoring an interior of the basket 20 is arranged at each of positions on the end wall 13*c* and lid plate 13*e* of the casing cover which are aligned with each other.

Now, the manner of operation of the centrifugal filtration apparatus of the illustrated embodiment thus constructed will be described in connection with separation of slurry into a liquid fraction and crystal First, the basket 20 is so arranged that the central axis thereof is inclined by a predetermined angle, about 10 to 30 degrees with respect to a horizontal direction to keep the bottom wall 20*b* of the basket downwardly obliquely inclined. Also, the crystal recovery suction pipe 33A is held at the retreat position indicated at the dashed lines in FIGS. 1 to 3 and the scraping blade 31C is held at the retreat position indicated at the dashed lines in FIG. 3. Thus, solid-liquid separation processing including a liquid feed step and a liquid removal step is started. In the liquid feed step, the motor 22 is first driven to rotate the basket 20 at a rotational speed suitable for liquid feed and the solenoid valve of the slurry feed unit 30 is open, so that slurry is fed through the slurry feed pipe 30A to the basket 20. During the liquid feed, when the sensor 45C of the liquid level detector 45 outputs a detection signal indicating that a liquid level of the slurry reaches a limit position, feed of the slurry to the basket is interrupted. Centrifugal force due to rotation of the basket 20 permits a liquid fraction of the slurry to be guided through the filter 28 to an outside of the basket, so that crystal contained in the slurry is deposited on the inner peripheral surface of the peripheral wall of the basket 20. The liquid fraction outwardly guided downwardly flows in the casing and then is discharged from the drainage pipe connection 11*d* through a valve and a drainage pipe (not shown).

When liquid removal progresses and lowering of the liquid level to a predetermined position is detected, slurry feed is restarted. Then, when the liquid level reaches the limit position, slurry feed is interrupted again.

When the operation described above is repeated, resulting in a thickness of crystal deposited in the form of a layer on the inner peripheral surface of the basket being increased, a period of time required for liquid removal is increased with an increase in thickness of the crystal layer. When a thickness of the crystal layer is substantially increased, resulting in a failure in detection of a reduction in liquid level within a predetermined period of time, feed of the slurry to the basket is stopped, leading to completion of the liquid step, After completion of the liquid feed Step, the basket 20 is increased In rotational speed to a Level suitable for liquid removal. The rotational speed is kept for a period of time for liquid removal previously determined by an experiment, resulting in the liquid removal step being carried out.

After the liquid removal time required elapses, a cleaning step is carried out for cleaning crystal collected in the basket. In the cleaning step, the solenoid valve of the cleaning liquid feed unit 34 is open to introduce cleaning liquid into the cleaning liquid feed pipe 34 while rotating the basket at a rotational speed suitable for cleaning of the crystal, so that the cleaning liquid is injected from the nozzle 34B toward the peripheral wall of the basket 20, resulting in the crystal being cleaned. After a period of time predetermined for cleaning of crystal elapses, a rotational speed of the basket is increased to a level required for liquid removal, so that cleaning liquid contained in the crystal is removed from the crystal.

Subsequent to the cleaning step, a crystal scraping step for scraping off crystal S (FIG. 1) formed in the basket 20 and a drying step for drying the crystal scraped are carried out. The crystal scraping step is practiced in such a manner that the hydraulic cylinder 37 of the crystal scraping unit 31 is driven to pivotally move the scraping blade 31C toward the peripheral wall 20*a* of the basket, resulting in the scraping blade 31C advancing into the crystal while keeping a rotational speed of the basket 20 reduced, so that the crystal is scraped off from the basket. Then, a drying step is executed. In the drying step, the heating unit 32 is operated to heat an interior of the casing 10, to thereby feed the basket with heat. Also, in the drying step, a valve (not shown) connected to the drainage pipe connection 11*d* is closed to tightly close the casing 10, which is then evacuated through suction pipe 33A of which the pivotally movable section 33*b* is held at the retreat position.

Heating of the interior of the basket by the heating unit 32 while rotating the basket as described above permits cleaning liquid contained in the crystal in the basket to be evaporated, leading to drying of the crystal. The basket is so arranged that the central axis thereof is kept inclined by 10 to 30 degrees with respect to a horizontal direction, as described above. Such arrangement of the basket permits crystal dried to be lifted from a lower portion of the peripheral wall of the basket toward an upper portion thereof and then invertedly dropped with rotation of the basket. Thus, the crystal is repeatedly turned over with rotation of the basket, during which it is uniformly exposed to heat, resulting in being efficiently dried in a short period of time.

Substantially the same advantage is likewise exhibited when the drying step is executed while keeping the central axis of the basket in a horizontal direction.

In the drying step, the scraping blade may be held at either the advance limit position or the retreat position.

When the casing is kept evacuated during drying of the crystal as described above, evaporation of liquid contained in the crystal is promoted; so that drying of the crystal may be accomplished in a short period of time even when a temperature for heating by the heating unit 32 is set at a low level, resulting in heat energy being significantly saved. Also, this permits the drying to be carried out while keeping a temperature in the basket at a low level, to thereby prevent the crystal from being thermally deteriorated. Further, evacuation of the casing permits oxygen to be removed from the basket or minimizes a content of oxygen in the basket, to thereby prevent a deterioration of the crystal due to oxidation.

The crystal drying step is completed after a period of time predetermined for the drying elapses. The drying permits crystal to exhibit free-flowing properties, resulting in being readily collected in a lower region of the basket.

After the drying step is completed, a crystal recovery step is executed while rotating the basket at a low speed. The crystal recovery step is practiced in such a manner that the vacuum suction unit connected to the crystal recovery suction pipe 33A is operated to actuate the cylinder 42, to thereby move or advance the forward end of the pivotally movable section 33*b* of the crystal recovery suction pipe 33A into the crystal while slowly pivotally moving the pivotally movable section 33*b* toward the last suction position, so that the crystal may be recovered by suction. When the pivotally movable section 33*b* reaches the last suction position, it is stopped, resulting in recovery of the crystal being continued. The dried crystal exhibits free-flowing properties as described above, to thereby be collected in a lowermost region of the basket to which the pivotally movable section 33*b* is orientated with the assistance of rotation of the basket 20, so that substantially all crystal in the basket may be recovered by suction through the forward end of the pivotally movable section 33*b*.

Rotation of the basket 20 is stopped at the time when recovery of the crystal is completed, resulting in a series of steps being completed. When it is desired that a series of steps from the solid-liquid separation step to the crystal recovery step is repeated for treatment of slurry for one lot, the basket is increased in rotational speed after the crystal recovery step is finished, followed by transfer to the next solid-liquid separation step.

Operation of the basket is stopped at the time when treatment of slurry for one lot is completed and then the casing cover 13 is open, followed by cleaning of the casing and basket.

When the filter 28 is constructed of the wire net 28A and perforated plate 28B into a rigid structure as described above, roundness of the filter is increased or improved, so that the advance limit position of the scraping blade may be set substantially in proximity to the filter, to thereby minimize remaining of crystal on the inner peripheral surface of the filter due to a failure in crystal scraping. Use of such a rigid filter increased in roundness advantageously reduces a distance between the forward end 33*b*1 of the pivotally movable section 33*b* of the crystal recovery suction pipe 33A and the filter when the forward end of the pivotally movable section 33*b* is moved to the last suction position, to thereby ensure satisfactory suction of crystal at the last suction position.

The steps in series described above are preferably carried out automatically. In order to automatically execute the steps described above, it is preferable to arrange a control unit for controlling the rotation drive mechanism 26, scraping blade drive unit 31D, suction pipe drive unit 33B, slurry feed unit 30, cleaning liquid feed unto 34 and heating unit 32 in a predetermined sequence so that the liquid feed step of feeding a predetermined amount of slurry to the basket while rotating the basket, the liquid removal step of removing a liquid fraction from crystal while keeping rotation of the basket, the cleaning step of feeding cleaning liquid to the basket to clean crystal while keeping rotation of the basket, the crystal scraping step of scraping off cleaned crystal from the basket while keeping rotation of the basket, the drying step of feeing heat to the basket to dry crystal while rotating the basket and the crystal recovery step of recovering dried crystal through the crystal recovery suction pipe by suction while holding the forward end of the pivotally movable section of the suction pipe and rotating the basket are executed in order.

Figure 6:
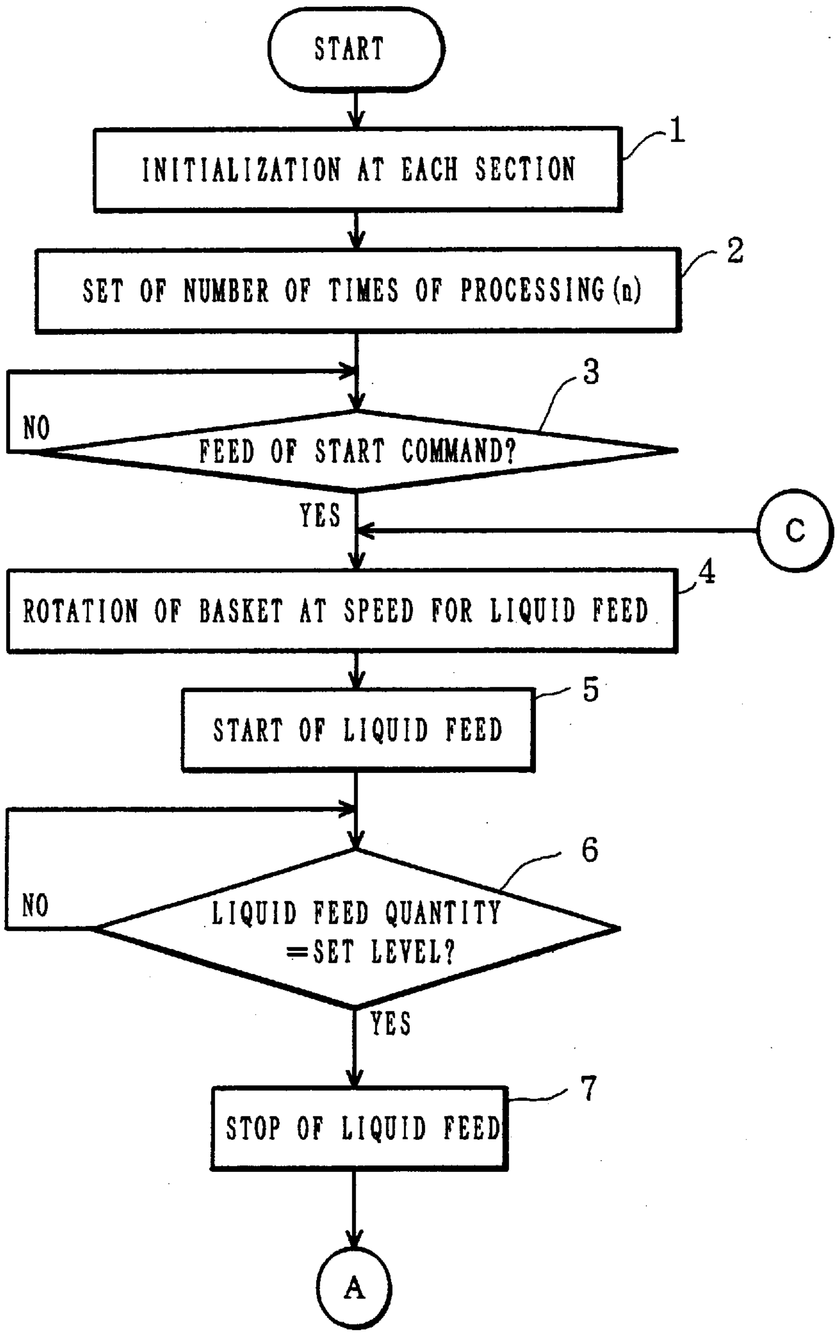
FIG. 6 is a flow chart showing a part of an algorithm in an example of a program used for realizing a control unit by a computer in a centrifugal filtration apparatus according to the present invention.
Figure 7:
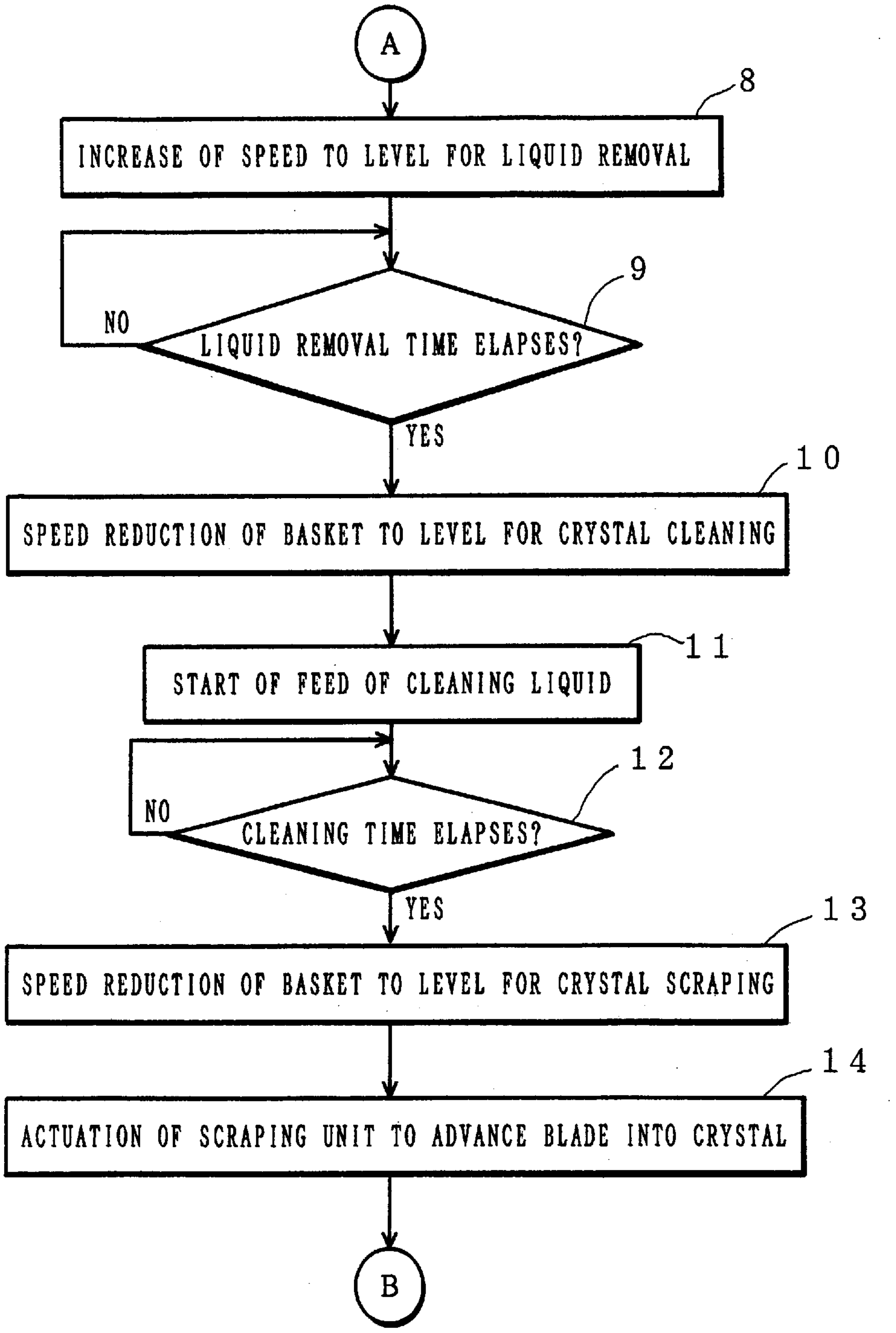
FIG. 7 is a flow chart showing another part of the algorithm.
Figure 8:
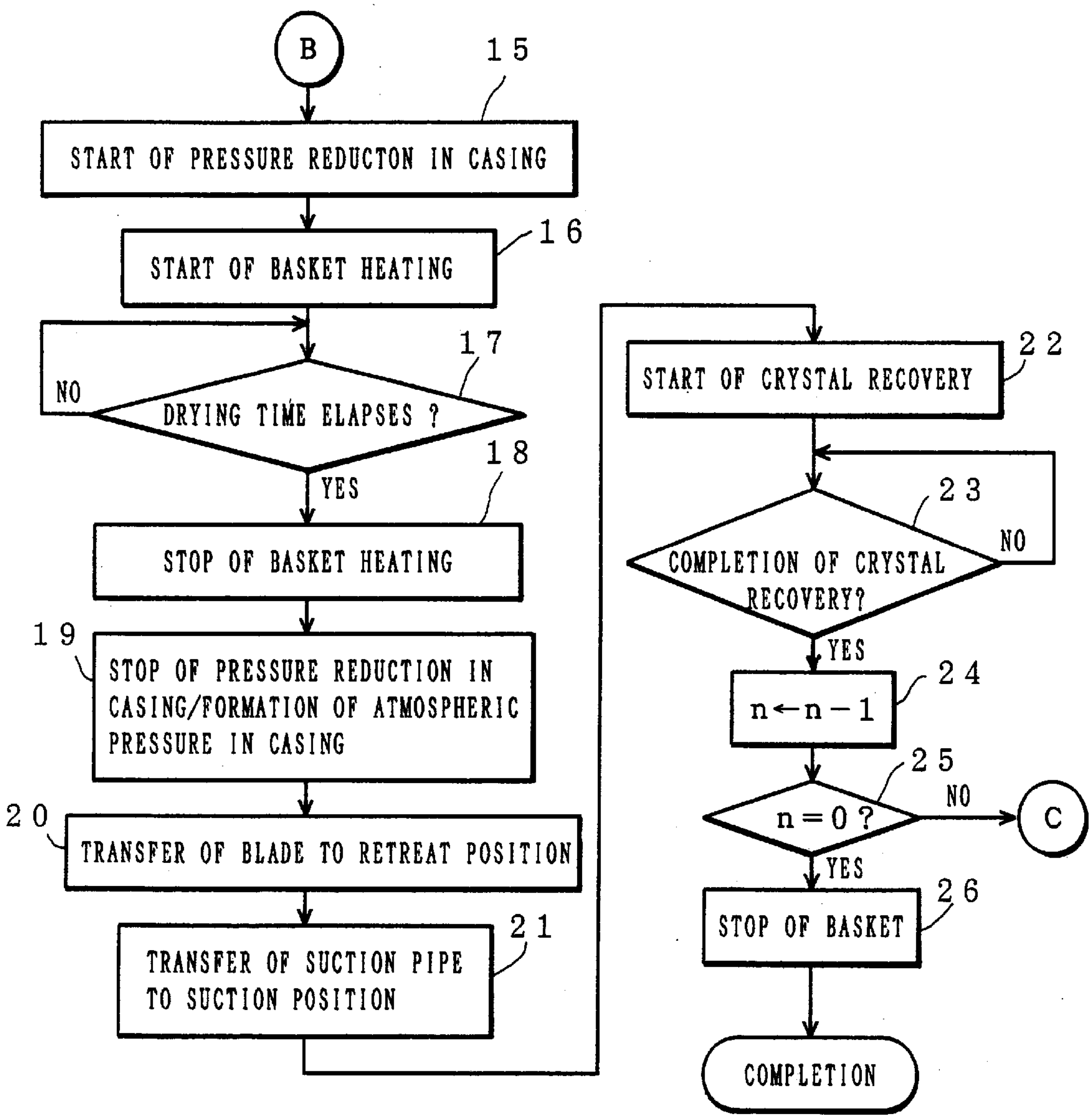
FIG. 8 is a flow chart showing a further part of the algorithm.

The control unit described above may be constructed by means of a microcomputer. A flow chart of algorism of a program executed by the microcomputer in such a control unit is shown in FIGS. 6 to 8 by way of example. Now, the manner of operation of the centrifugal filtration apparatus carried out according to the flow chart will be described hereinafter.

When the microcomputer constituting the control unit is turned on, initialization at each of sections is first executed in a step 1 shown in FIG. 6. At this time, the scraping blade 31C of the crystal scraping unit 31 is held at the retreat position and the pivotally movable section 33*b* of the suction pipe 33A of the crystal recovery unit 33A is likewise held at the retreat position.

After the initialization at each section, the number of times of processing for one lot is set in a step 2, followed by transfer to a step 3, wherein feeding of a start command from a push button switch or the like is waited for. When the start command is fed, a step 4 is executed, so that operation of the basket 20 is started to increase a rotational speed thereof to a level required for liquid feed. Then, a step 5 is executed to start liquid feed at the time when a rotational speed of the basket reaches a level required for liquid feed, resulting in the liquid feed step being carried out. In the liquid feed step, the slurry feed unit 30 is so controlled that a detection output of the liquid level detector 45 is used to eliminate overfeeding of liquid.

Then, a step 6 is executed. In the step 6, it is judged whether or not the amount of liquid reaches a set level. As a result, when the liquid level detector 45 does not detect a decrease in liquid level within a predetermined period of Lime, so that it is judged that the amount reaches the set level, liquid feed is stopped in a step 7. Then, a step 8 shown in FIG. 7 is executed, so that the liquid removal step is carried out while increasing a rotational speed of the basket to a level required for liquid removal. Then, when it is detected in a step 9 that a period of time determined for the liquid removal elapses, a step 10 is executed to adjust a rotational speed of the basket to a level suitable for crystal cleaning, followed by transfer to a step 11, wherein feed of the cleaning liquid is started. Then, a step 12 is executed. When it is detected in the step 12 that a period of time set for the cleaning step elapses, a step 13 is executed to decrease a rotational speed of the basket to a level required for crystal scraping step. Then, a step 14 is executed to permit the scraping blade 31C to advance into crystal deposited on the inner peripheral surface of the basket, to thereby scrape off the crystal.

Subsequently, a step 15 shown in FIG. 8 is executed, so that a decrease in pressure in the casing is started. Then, in a step 16, the heating unit 32 is actuated to start heating of the basket, to thereby dry crystal while rotating the basket. A step 17 is executed, so that when it is detected that a predetermined period of time for the drying elapses, a step 18 is executed to stop heating of the basket, followed by execution of a step 19 to interrupt a reduction in pressure in the casing. Concurrently, the valve connected to the drainage pipe connection 11*d* is open, to thereby form an atmospheric pressure in the casing.

Thereafter, a step 20 is executed to move the scraping blade 31C to the retreat position, followed by execution of a step 21, so that the crystal recovery suction pipe is moved toward the last suction position. Then, in a step 22, the vacuum suction units operated to start recovery o crystal. Then, when it is detected in a step 23 that recovery of crystal is completed, the prospering is transferred to a step 24, wherein the number of times of the processing is zero reduced by one (1). Then, a step 25 is executed, wherein it is judged whether or not the number of times of the processing is zero (0). As a result when it is not 0, the step 4 is executed again to start the liquid feed step; whereas when it is 0, rotation of the basket is stopped to complete a series of the steps.

In the illustrated embodiment, the basket 20 is so arranged that the central axis thereof is constantly kept inclined by a predetermined angle with respect to a horizontal direction. However, in the present invention, it is merely required that in the drying step, the central axis of the basket is held horizontal or held inclined at a predetermined angle within a range of, for example, 10 degrees and 30 degrees and in the crystal recovery step, the central axis is kept inclined at a predetermined angle with respect to a horizontal direction to orientate the bottom wall 20*b* of the basket 20 in an oblique and downward direction. Thus, it is not necessarily required that the central axis of the basket 20 is constantly held inclined at a predetermined angle with respect to a horizontal direction. For example, in each of the solid-liquid separation step, cleaning step and drying step, the central axis of the basket may be held horizontal and in the crystal recovery step, it may be inclined by a predetermined angle with respect to a horizontal direction to orientate the bottom wall in an oblique and downward direction.

When the central axis of the basket 20 is constantly held inclined at a predetermined angle with respect to a horizontal direction, arrangement of the basket inclination angle adjustment mechanism may be eliminated. In this instance, it is not required to separate the frame into the base frame 2 and movable frame 3. In the illustrated embodiment, the central axis of the basket is held inclined at a predetermined angle with respect to a horizontal direction in the steps extending from the solid-liquid separation step to the crystal recovery step. For this purpose, an angle of inclination of the central axis of the basket with respect to a horizontal direction is set to be 10 to 30 degrees in order to ensure that the solid-liquid separation step is smoothly carried out. Whereas, when the central axis of the basket is held inclined at a predetermined angle with respect to a horizontal direction only in the crystal recovery step, the angle may be increased to a level as high as about 45 degrees. This permits inclination of the peripheral wall 20*a* of the basket to be rendered steep, resulting in crystal readily flowing toward the last suction position (or the corner P), so that the amount of crystal remaining in the basket may be minimized.

Also, in this instance, the basket inclination angle adjustment mechanism may be controlled so as to gradually increase an angle of inclination of the central axis of the basket with respect to a horizontal direction to about 45 degrees with progress of crystal recovery in the crystal recovery step.

The illustrated embodiment, as described above, is so constructed that the central axis of the basket may be variably set as desired between a state that it is kept horizontal and a state that it held inclined by an angle of about 10 to 30 degrees with respect to a horizontal direction. Alternatively, the basket inclination angle adjustment mechanism may be constructed so as to ensure that the central axis of the basket may be kept either vertical or inclined by an angle of about 10 to 30 degrees with respect to a horizontal direction. In this instance, in the solid-liquid separation step and cleaning step, the central axis is kept vertical and in the drying step and crystal recovery step, it may be kept inclined by an angle of about 10 to 30 degrees with respect to a horizontal direction.

In the illustrated embodiment, the heating unit 32 is mounted on the inner peripheral surface of the casing cover. Alternatively, it may be inserted into the basket 20 while being arranged so as to extend through the end wall 13*c* and lid plate 13*e* of the casing cover 32. In this instance, the heating unit may be installed at a position which keeps the heating unit from interfering with the liquid feed step and liquid removal step, such as a position in proximity to a center of the basket. Also, in this instance, the heating unit may comprise an electric heater, radiation pipe equipped with radiation fins in which heated fluid is circulated or the like.

In the embodiment shown in FIGS. 1 to 4, the casing is kept evacuated during drying of crystal. However, such evacuation of the casing is not necessarily required. When the casing is not evacuated for the crystal driving step, the heating unit may be constructed so as to permit clean hot air to be blown into the basket 20.

The above-described construction of the illustrated embodiment that the casing cover 13 is provided with the lid plate 13*e* for closing the opening of the basket 20 effectively prevents leakage of crystal from the opening of the basket during rotation of the basket for drying crystal while repeatedly turning over it.

Further, in the illustrated embodiment, the lid plate 13*e* is mounted thereon with the lid member 27A made of a rubber material to close the gap g1 between the lid plate 13*e* and the inner peripheral surface of the end wall 20*c* of the basket with the lid member 27A, resulting in effectively preventing leakage of crystal from the basket. However, it is not necessarily required to arrange the lid member. A region at which the outer periphery of the lid plate 13*e* and the inner periphery of the end wall 20*c* of the basket are opposite to each other may be constructed in any other manner for preventing leakage of crystal without the lid member 13*e*.

Figure 5:
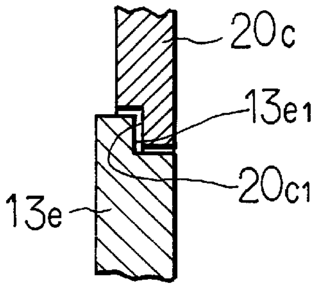
FIG. 5 is fragmentary sectional view showing a modification of arrangement of an end plate of a basket and a lid plate on a casing cover in a manner to be opposite to each other in a centrifugal filtration apparatus according to the present invention.

For example, the illustrated embodiment, as shown in FIG. 5, may be so constructed that the inner peripheral section 20*c*1 of the end wall 20*c* of the basket is provided thereon with a step in a manner to extend in a circumferential direction thereof and the lid plate 13*e* is provided on the outer peripheral surface thereof with a step 13*e*1 in a manner to be opposite to the above-described step on the inner peripheral section 20*c*1. Such construction permits a labyrinth seal to be provided at a region at which the outer peripheral surface of the lid plate 13*e* and the inner peripheral section 20*c*1 of the end wall 20*c* of the basket are opposite to each other, to thereby prevent leakage of crystal and liquid therefrom.

In the embodiment shown in FIGS. 1 to 4, the lid member 27B is arranged so as to close the gap g2 between the cuter peripheral section of the end wall of the basket and the inner collar 13*d* of the casing cover. This effectively prevents mist formed in the casing 13 during the so liquid separation step and cleaning step from leaking to a space on the side of the end wall 13*c* of the casing 13, resulting in pollution on an inner surface of the end wall 13*c* by the mist being positively prevented. Alternatively, arrangement of the lid member 27B may be eliminated. Also, the lid member 27B may be replaced with a labyrinth seal which may be arranged at a region at which the outer peripheral section of the lid plate 13*e* of the basket and the inner collar 13*d* of the casing cover are opposite to each other.

Also, in the embodiment shown in FIGS. 1 to 4, the hydraulic cylinder is used as the drive source for each of the drive unit 31D provided on the crystal scraping unit 31 and the drive unit 33B provided on the crystal recovery unit 33. The drive units each may be constructed in any desired manner. For example, a rotational displacement-linear displacement conversion mechanism including a threaded rod and a nut threadedly fitted on the threaded rod may be used to convert rotation of the motor into linear motion, which is then transmitted to the arms 38 and 43, to thereby pivotally move the drive shaft 31A of the crystal scraping unit and the suction pipe 33A of the crystal recovery unit. Also, rotation of the motor may be transmitted through a gear transmission mechanism to the drive shaft 31A and suction pipe 33A.

Figure 9:
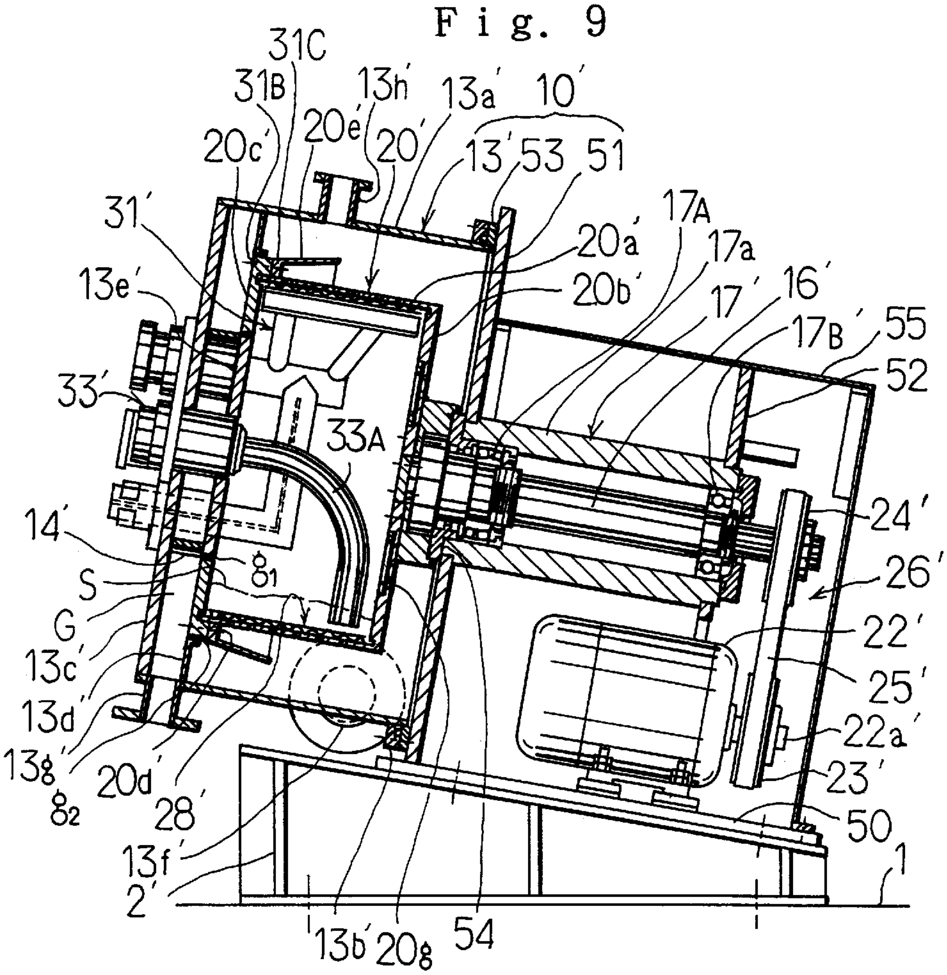
FIG. 9 is a vertical sectional view showing another embodiment of a centrifugal filtration apparatus according to the present invention.
Figure 10:
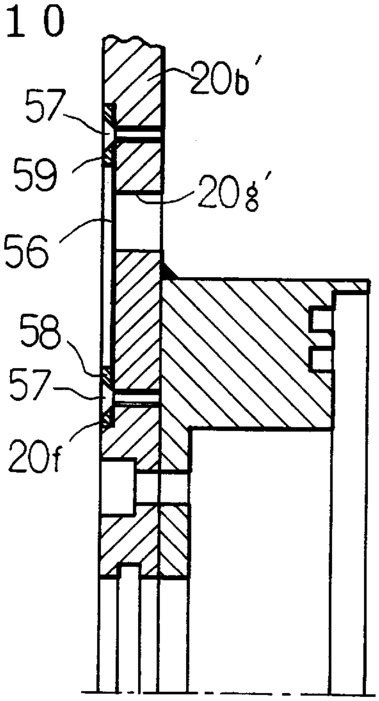
FIG. 10 is a fragmentary enlarged vertical sectional view showing an essential part of a basket incorporated in the centrifugal filtration apparatus shown in FIG. 9.
Figure 11:
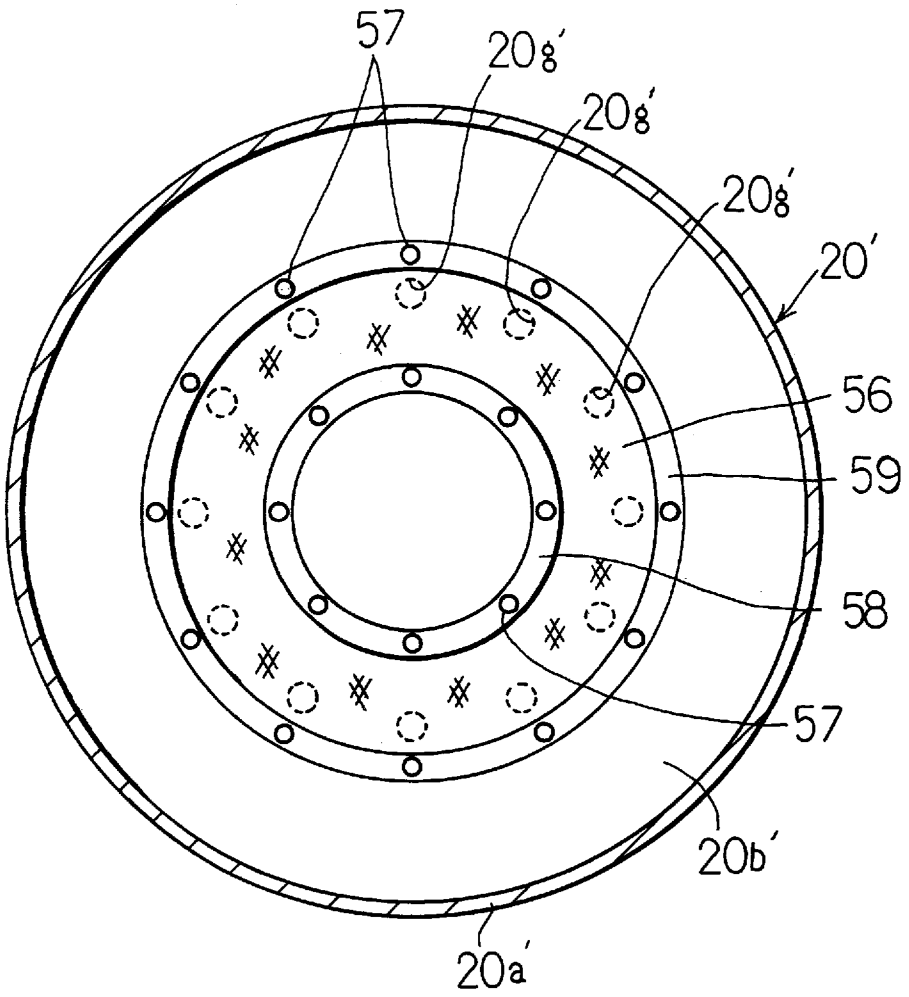
FIG. 11 is a plan view showing a basket incorporated in the centrifugal filtration apparatus shown in FIG. 9.

Referring now to FIGS. 9 to 11, another embodiment of a centrifugal filtration apparatus is illustrated. In FIG. 9, reference character 2' designates a base frame fixedly arranged on an installation base 1. The base frame 2' has an upper inclined surface formed so as to be inclined by an angle of 10 to 30 degrees with respect to a horizontal direction, on which a base plate 50 is fixedly mounted. Reference numerals 51 and 52 each designate a frame plate which has a surface arranged perpendicularly to the base plate 50 and is mounted at a lower end thereof on the base plate 50. The frame plates 51 and 52 cooperate together to support a bearing unit 17' thereon. The bearing unit 17' includes a cylindrical housing 17*a* and ball bearings 17A' and 17B' received i n the housing 17*a*, which act to rotatably support a revolving shaft 16' therein.

The frame plate 51 is securely mounted hereon with an annular flange plate 53 and has a casing cover 13' coupled thereto through a hinge (not shown) in an openable manner. The casing cover 13' Includes a cylindrical peripheral wall 13*a*, adapted to be aligned with the flange plate 53, an outer flange 13*b*' formed on one end of the peripheral wall 13*a*' defined in an axial direction thereof, an end wall 13*c*' arranged for closing the other end of the peripheral wall 13*a*' in the axial direction, an inner collar 13*d*' formed on an inner periphery of the peripheral wall 13*a*' while being positioned inside the end wall 13*c*', and a lid plate 13*e*' of a disc-line shape arranged so as to be concentric with the inner collar 13*d*' while being positioned inwardly of the inner periphery of the inner collar 13*d*' in a radial direction thereof and connected to the end wall 13*c*' by means of a connection member 14'.

The casing cover 13' is arranged so as to be pivotally moved about the hinge (not shown) between a closed position at which the peripheral wall 13*a*' is abutted against the flange plate 53 as shown in FIG. 9 and an open position at which a central axis of the peripheral wall 13*a*' is rendered perpendicular to that of the revolving shaft 16'. Between the flange 13*b*' of the casing cover and the flange plate 53 is arranged a packing (not shown), so that the flange 13*b*' is fastened to the flange plate 53 using any suitable fastening means such as bolts or the like while holding the casing cover 13' at the closed position, resulting in joining between the flange 13*b* of the casing cover and the flange plate 53 being carried out both airtightly and liquid-tightly. In the illustrated embodiment, the casing cover 13', flame plate 51 and flange plate 53 cooperate together to provide the casing 10', of which a bottom is constructed of the flame plate 51.

The revolving shaft 16' has one end supported by the bearing unit 17' and introduced into the casing 10' through a seal member 54 mounted on the flame plate 51 and the other end led out of an end of the bearing unit 17'.

The apparatus of the illustrated embodiment also Includes a basket 20' which includes a peripheral wall 20*a*', a bottom wall 20*b*' arranged so as to close one end of the peripheral wall 20*a*' defined in an axial direction thereof, and an annular end wall 20*c*' arranged so as to be projected inwardly in a radial direction thereof from an inner periphery of the other end of the peripheral wall 20*a* ' defined in the axial direction thereof. An outer flange 20*d*' is arranged on a portion of an outer periphery of the peripheral wall 2*a*' of the basket positioned in proximity to the other end of the peripheral wall in the axial direction. The end wall 20*c*' is constituted by an annular plate detachably mounted on the outer flange 20*d*' by means of bolts or the like. The peripheral wall 20*a*' of the basket is formed with a number of through-holes while being uniformly distributed over the whole peripheral wall. The outer flange 20*d*' is mounted on an outer periphery thereof with a shade-like shield plate 20*e*' by welding in a manner to concentrically surround the basket 20'. The shield plate 20*e*' is formed so as to be gradually increased in inner diameter toward the bottom wall 20*b*' of the basket.

The basket 20' is arranged in the casing 10' while keeping a central axis thereof aligned with those of the casing 10' and bearing unit 17' and keeping the bottom wall 20*b*' facing the flame plate 51 and fixed through an outer surface of a central portion of the bottom wall 20*b* to one end of the revolving shaft 16'. Therefore, the basket 20' is arranged so that the central axis thereof is constantly kept inclined by an angle of about 10 to 30 degrees with respect to a horizontal direction, to thereby orientate the bottom wall 20*b*' in an oblique and downward direction.

The base plate 50 is mounted thereon with a motor 22' acting as a drive source for rotating the basket 20', which motor includes a revolving shaft 22*a*' and a pulley 23' mounted on the revolving shaft 22*a*'. Also, a pulley 24' is mounted on the other end of the revolving shaft 16' outwardly led out of the end of the bearing unit 17' and a belt 25' is arranged so as to extend through the motor 22' and pulleys 23' and 24'. The motor 22', pulleys 23' and 24' and belt 25' cooperate with each other to provide a rotation drive unit 26' for rotating the revolving shaft 16' and basket 20'.

The base plate 50 is mounted he-eon with a cover 55 for covering the bearing unit 17' and rotation drive unit 26'.

The lid plate 13*e*' of the casing cover 13' is arranged as to be loosely fitted in an inner peripheral section of the end wall 20*c*' of the basket 20' wheel the casing covet 13' is held at the closed position, so that a microgap g1 may be formed between an outer periphery of the lid plate 3*e*' and the inner peripheral section of the end wall 20*c* of the basket. Also, the inner collar 13*d*' of the casing cover 13' is arranged so as to externally surround an outside of the outer peripheral section of the end wall 20*c*' of the basket 20' when the casing cover 13' is held at the closed position, resulting in a microgap g2 being formed between an inner periphery of the inner collar 13*d*' and the outer peripheral section of the end wall 20*c*' of the basket.

In the illustrated embodiment, arrangement of members like the lid members 27*a* and 27B incorporated in the embodiment described above with reference to FIGS. 1 to 4 is eliminated.

The peripheral wall 20*a*' of the basket 20' is fitted therein with a filter 28' which may be constructed in substantially same manner as in the embodiment of FIG. 1. The filter 28' is then fixed in the inner periphery of the basket using any suitable fixing means.

The casing cover 13' is mounted thereon with a crystal scraping unit 31' for scraping off crystal depositedly formed on the inner periphery of the peripheral wall 20*a*' of the basket 20' and a crystal recovery unit 33' equipped with a crystal recovery suction pipe 33A'. The casing cover 13' is also mounted thereon with a cleaning liquid feed unit for feeding the basket with cleaning liquid, a slurry feed unit for feeding the basket with slurry and a heating unit for feeding the basket with heat to dry crystal in the basket, and the like. Illustration of the units in the drawings is eliminated for the sake of brevity.

In the illustrated embodiment, the peripheral wall 13*a*' of the casing cover 13' is provided thereon with a drainage pipe connection 13*f*', a drain pipe connection 13*g*', and a pressure reducing unit connection 13*h*' to which a pressure reducing unit such as a vacuum pump or the like is connected for evacuating the casing.

The drainage pipe connection **13*f*' is provided so as to permit a drainage pipe for outwardly guiding a liquid fraction discharged from the basket to be connected thereto. For this purpose, it is arranged so as to be located a lowermost position when the casing cover 13' is held at the closed position as shown in FIG. 9**.

The drain pipe connection **13*g*' is constructed so as to permit a drain pipe for outwardly guiding a liquid entering a gap G between the inner collar 13*d*' of the casing cover 13' and the end wall 13*c*' through the gaps g1 and g2 to be connected thereto. The drain pipe connection 13*g*' is arranged so as to permit the inner collar 13*d*' and end wall 13*c*'** to communicate with each other through the gap G while being downwardly orientated when the casing cover is held at the closed position.

The pressure reducing unit connection **13*h*' is arranged so as to be opposite to the above-described shield plate 20*e*' mounted on the outer periphery of the basket. Also, the connection 13*h*' is arranged so as to be upwardly open when the casing cover 13'** is held at the closed position and connected to the pressure reducing unit through a piping (not shown).

Further, as shown in FIGS. 10 and 11, the bottom wall **20*b*' of the basket 20' is formed on an inner surface thereof with an annular recess 20*f*' so as to surround the central axis of the basket. Also, the bottom wall 20*b*' is formed with a number of gas passage holes 20*g*' in a manner to extend through a bottom of the recess 20*f*', resulting in an interior of the basket communicating with an exterior thereof through the holes 20*g*'. The recess 20*f*' has an annular filter 56 fitted therein for covering the gas passage holes 20*g*'. The filter 56 is fixed in the recess 20*f*' by means of ring-like presser plates 58 and 59 respectively arranged on inner and outer peripheral sides of the recess 20*f*' and fastened to the bottom wall 20*b*' using screws 57. The filter 56** may be formed of a wire mesh, a perforated plate or the like which has a mesh size sufficient to prevent crystal formed in the basket from passing therethrough.

In the embodiment shown in FIGS. 9 to 11, as described above, the bottom wall of the basket 20' is formed with the gas passage holes **20*g*' covered with the filter. Such arrangement permits the basket 20' to be rapidly evacuated through the gas passage holes 20*g*' when the evacuation through the pressure reducing unit connection 13*h*'** is required in the crystal drying in a short Period o time.

Also, arrangement of the shade-like shield plate **20*e*' in a manner to be opposite to the pressure reducing unit connection 13*h*' of the peripheral wall of the basket as shown in FIG. 9 effectively prevents liquid discharged via the through-holes of the peripheral wall of the basket from being scattered toward the pressure reducing unit connection 13*h*', to thereby restrain the liquid from flowing toward the pressure reducing unit. Also, the shield plate 20*e*' functions to guide liquid discharged through the peripheral wall of the basket toward the bottom of the casing, to thereby restrain the liquid from entering the gap between the lid plate 13*e*' and the end wall 13*c*' through the gap g2**.

As shown in FIGS. 1 to 4 or FIG. 9, arrangement of basket 20 or 20' in the tightly sealable casing 10 or 10' permits all steps extending from the solid-liquid separation step to the crystal recovery step to be carried out in the space tightly closed, to thereby substantially prevent a deterioration of crystal due to inclusion of any impurity therein.

Nevertheless, the present invention is not limited to such arrangement of the basket in the casing constructed in a manner to be closable. Thus, the present invention may be suitably applied to arrangement wherein the basket is rotatably supported in the casing of an open structure.

In each of the embodiments described above, the basket is adapted to be rotated during recovery of crystal. However, when crystal exhibits free-flowing properties increased to a degree sufficient to permit the crystal to be collected without rotation of the basket, crystal recovery may be conveniently carried out while keeping the basket stationary.

Also, the present invention may be constructed in such a manner that rotation of the basket is kept stopped at an initial stage of the crystal recovery step and then the basket is rotated at a stage of the step at which crystal recovery progresses to a degree Such construction facilitates collection of crystal in one lowermost portion of the basket.

In addition, repeating of rotation and interruption of the basket during he crystal recovery step permits collection and recovery of crystal to be carried cut at the lowermost portion of the basket.

Further, in each of the embodiments described above, the drying step is carried out after the crystal scraping step. Alternatively, heating in the basket may be started before or during the crystal scraping step, so that the crystal scraping step and drying step may be concurrently accomplished in parallel with each other.

As can be seen from the foregoing, the present invention is constructed in the manner that during the crystal recovery step, the central axis of the basket is kept inclined with respect to a horizontal direction, resulting in crystal in the basket being ultimately collected at the corner of the basket between the lowermost portion of the peripheral wall of the basket and the bottom wall thereof and concurrently the crystal recovery suction pipe is displaced at the forward end thereof to a position in proximity to the above-described corner. Such construction minimizes the amount of crystal remaining in the basket, to thereby increase recovery of crystal.

In particular, the present invention, when the crystal recovery step is practiced after the drying step, permits substantially all crystal to be recovered by suction, to thereby highly increase recovery of crystal, because crystal is provided with increased free-flowing properties during the crystal recovery step.

Also, the present invention permits the steps extending from the solid-liquid separation step to the crystal recovery step to be carried out in the same basket, to thereby prevent a deterioration in quality of crystal due to inclusion of any impurity in the crystal.

Further, when the present invention is constructed so as to keep the basket evacuated during the crystal drying step, heat energy fed to the basket can be reduced, to thereby promote energy savings. Also, his permits a temperature of crystal during the drying step to be held at a reduced level, to thereby minimize thermal deterioration of crystal.

Moreover, a reduction in pressure in the casing and basket to be substantially removed therefrom or a content of oxygen therein to be reduced at least to a sufficient degree, resulting in crystal being kept from being oxidized.

While preferred embodiment of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A centrifugal filtration method comprising:

a solid-liquid separation step of subjecting slurry to centrifugal filtration by means of a centrifugal filtration apparatus to separate slurry into a liquid fraction and crystal;

said centrifugal filtration apparatus including a basket constructed of a cylindrical peripheral wall formed with a plurality of through-holes, a bottom wall arranged so as to close one end of the peripheral wall defined in an axial direction thereof and an annular end wall arranged so as to be projected inwardly in a radial direction of the peripheral wall from an inner periphery of the other end of the peripheral wall defined in the axial direction, as well as a rotation drive unit for rotating said basket;

the crystal being deposited on an inner peripheral surface of the basket during said solid-liquid separation step;

a crystal scraping step of scraping off crystal deposited on the inner peripheral surface of said basket; and a crystal recovery step of advancing a forward end of a crystal recovery suction pipe inserted into said basket into crystal in said basket to suck crystal and concurrently displacing the forward end of said suction pipe to a corner of said basket between a lowermost portion of the peripheral wall of said basket and the bottom wall of said basket to recover crystal in said basket while inclining a central axis of said basket by a predetermined angle with respect to a horizontal direction to orientate the bottom wall of said basket in an oblique and downward direction.

2. A centrifugal filtration method comprising:

a solid-liquid separation step of subjecting slurry to centrifugal filtration by means of a centrifugal filtration apparatus to separate the slurry into a liquid fraction and crystal;

said centrifugal filtration apparatus including a basket constructed of a cylindrical peripheral wall formed with a plurality of through-holes, a bottom wall arranged so as to close one end of the peripheral wall defined in an axial direction thereof and an annular end wall arranged so as to be projected inwardly in a radial direction of the peripheral wall from an inner periphery of the other end of the peripheral wall defined in the axial direction, as well as a rotation drive unit for rotating said basket;

said basket being rotatably arranged in a tightly closable casing;

the crystal being deposited on an inner peripheral surface of the basket during said solid-liquid separation step;

a cleaning step of feeding cleaning liquid to said basket to clean crystal;

a crystal scraping step of scraping off crystal on the inner peripheral surface of said basket while rotating said basket at a low speed;

a drying step of feeding heat to said basket to dry crystal in the basket while rotating said basket; and a crystal recovery step of advancing a forward end of a crystal recovery suction pipe inserted into said basket into crystal in said basket to suck crystal and concurrently displacing the forward end of said suction pipe to a corner of said basket between a lowermost portion of the peripheral wall of said basket and the bottom wall of said basket to recover crystal in said basket while inclining a central axis of said basket by a predetermined angle with respect to a horizontal direction to incline the bottom wall of said basket;

said steps being carried out while keeping said casing tightly closed.

3. A centrifugal filtration method as defined in claim 2, wherein said drying step is carried out while reducing a pressure in each of said casing and basket.

4. A centrifugal filtration apparatus comprising:

a basket including a cylindrical peripheral wall formed with a plurality of through-holes, a bottom wall arranged so as to close one end of said peripheral wall defined in an axial direction thereof and an annular end wall arranged so as to be projected inwardly in a radial direction of said peripheral wall from an inner periphery of the other end of said peripheral wall defined in the axial direction and supported in a manner to be rotatable;

a rotation drive unit for rotating said basket;

a slurry feed unit for feeding slurry to said basket;

a crystal scraping unit for scraping of crystal deposited on an inner peripheral surface of said peripheral wall of said basket; and a crystal recovery unit including a crystal recovery suction pipe inserted into said basket;

said basket being arranged in a manner to keep a central axis thereof inclined to obliquely downwardly incline said bottom wall;

said crystal recovery suction pipe including a pivotally movable section pivotally moved in said basket and being so arranged that said pivotally movable section is displaced at a forward end thereof between a last suction position defined in proximity to a corner of said basket between a lowermost portion of said peripheral wall of said basket kept inclined and said bottom wall of said basket and a retreat position at which said forward end is retreated inwardly of a position corresponding to an inner periphery of an opening of said basket.

5. A centrifugal filtration apparatus comprising:

a basket including a cylindrical peripheral wall formed with a plurality of through-holes, a bottom wall arranged so as to close one end of said peripheral wall defined in an axial direction thereof and an annular end wall arranged so as to be projected inwardly in a radial direction of said peripheral wall from an inner periphery of the other end of said peripheral wall defined in the axial direction and supported in a manner to be rotatable;

a rotation drive unit for rotating said basket;

a slurry feed unit for feeding slurry to said basket;

a crystal scraping unit for scraping off crystal deposited on an inner peripheral surface of said peripheral wall of said basket;

a crystal recovery unit including a crystal recovery, suction pipe inserted into said basket; and a basket inclination angle adjustment mechanism for adjusting an angle of inclination of a central axis of said basket with respect to a horizontal direction so as to incline said central axis off said basket by a predetermined angle with respect to the horizontal direction to orientate said bottom wall of said basket in an oblique and downward direction at least during recovery of crystal;

said crystal recovery suction pipe including a pivotally movable section pivotally moved in said basket and being so arranged that said pivotally movable section is displaced at a forward end thereof between a last suction position defined in proximity to a corner of said basket between a lowermost portion of said peripheral wall of said basket kept inclined and said bottom wall of said basket and a retreat position at which said forward end is retreated inwardly of a position corresponding to an inner periphery of an opening of said basket.

6. A centrifugal filtration apparatus comprising:

a casing including an openable cover and arranged so as to be tightly closed when said cover is closed;

a basket including a cylindrical peripheral wall formed with a plurality of through-holes, a bottom wall arranged so as to close one end of said peripheral wall defined in an axial direction thereof and an annular end wall arranged so as to be projected inwardly in a radial direction of said peripheral wall from an inner periphery of the other end of said peripheral wall defined in the axial direction;

said basket being arranged in said casing;

a revolving shaft arranged outside said basket so as to be coaxial with said basket and having one end coupled to an outer surface of said bottom wall of said basket;

said revolving shaft being rotatably supported by a bearing unit fixed with respect to said casing;

a rotation drive unit for rotating said revolving shaft;

a slurry feed unit for feeding slurry to said basket;

a cleaning liquid feed unit for feeding said basket with cleaning liquid for cleaning crystal formed in said basket;

a heating unit for feeding heat to said basket to dry crystal cleaned by said cleaning liquid;

a crystal scraping unit for scraping off crystal deposited on an inner peripheral surface of said peripheral wall of said basket;

a crystal recovery unit for recovering crystal in said basket;

a control unit for controlling said rotation drive unit, slurry feed unit, cleaning liquid feed unit, crystal scraping unit and crystal recovery unit so that a liquid feed step of feeding a predetermined amount of slurry to said basket while rotating said basket, a liquid removal step of removing a liquid fraction contained in said slurry therefrom while rotating said basket, a cleaning step of feeding cleaning liquid to said basket to clean crystal deposited on said inner peripheral surface of said peripheral wall of said basket while rotating said basket, a crystal scraping step of scraping off crystal on said inner peripheral surface of said basket while rotating said basket, a drying step of feeding heat to said basket to dry crystal while rotating said basket and a crystal recovery step of recovering dried crystal in said basket by means of said crystal recovery unit are carried out; and a basket inclination angle adjustment mechanism for adjusting an angle of inclination of a central axis of said basket with respect to a horizontal direction so as to incline said central axis of said basket by a predetermined angle with respect to the horizontal direction to orientate said bottom wall of said basket in an oblique and downward direction at least during said crystal recovery step;

said crystal recovery unit including a crystal recovery suction pipe which includes a straight pipe section arranged so as to extend in parallel with said axis of said basket and rotatably supported while extending through said cover of said casing at a position deviated from said central axis of said basket and a pivotally movable section having a rearward end connected to an end of said straight pipe section defined on a side of said basket and a forward end orientated toward said peripheral wall of said basket and arranged so as to be pivotally moved with rotation of said straight pipe section and a suction pipe drive unit for rotating said straight pipe section of said crystal recovery suction pipe to pivotally move said pivotally movable section in said basket;

said crystal recovery suction pipe being so arranged that said pivotally movable section is displaced at said forward end thereof between a last suction position defined in proximity to a corner of said basket between a lowermost portion of said peripheral wall of said basket kept inclined and said bottom of said basket and a retreat position at which said forward end is retreated inwardly of a position corresponding to an inner periphery of an opening of said basket;

said control unit being constructed so as to displace said forward end of said pivotally movable section of said crystal recovery suction pipe to said last suction position during said crystal recovery step.

7. A centrifugal filtration apparatus as defined in claim 6, wherein said cover of said casing is mounted thereon with a lid plate;

said lid plate being arranged so as to be rendered opposite to said inner periphery of said end wall of said basket through a microgap defined therebetween to close an opening defined inside said end wall when said cover of said casing is at a closed position;

said bottom wall of said basket is formed with gas passage holes in a manner to extend therethrough and provided on an inside thereof with a filter so as to cover said gas passage holes; and said casing is provided with a pressure reducing unit connection to which a pressure reducing unit for reducing a pressure in said casing is connected.

8. A centrifugal filtration apparatus comprising:

a casing including an openable cover and arranged so as to be tightly closed when said cover is closed;

a basket including a cylindrical peripheral wall formed with a plurality of through-holes, a bottom wall arranged so as to close one end of said peripheral wall defined in an axial direction thereof and an annular end wall arranged so as to be projected inwardly in a radial direction of said peripheral wall from an inner periphery of the other end of said peripheral wall defined in the axial direction;

said basket being arranged in said casing;

a revolving shaft arranged outside said basket so as to be coaxial with said basket and having one end coupled to an outer surface of said bottom wall of said basket;

said revolving shaft being rotatably supported by a bearing unit fixed with respect to said casing;

a rotation drive unit for rotating said revolving shaft;

a crystal recovery unit for recovering crystal in said basket;

a crystal scraping unit including a drive shaft inserted into said basket through said cover of said casing, a scraping blade mounted on said drive shaft and pivotally moved between an advance limit position at which it approaches said peripheral wall of said basket and a retreat position at which it is retreated inwardly of a position corresponding to an inner periphery of said end wall of said basket with rotation of said drive shaft and a scraping blade drive mechanism for driving said drive shaft to pivotally move said scraping blade;

a slurry feed unit for feeding slurry to said basket;

a cleaning liquid feed unit for feeding said basket with cleaning liquid for cleaning crystal formed in said basket;

a heating unit for feeding heat to said basket to dry crystal in said basket; and a control unit for controlling said rotation drive unit, crystal scraping unit, crystal recovery unit, slurry feed unit, cleaning liquid feed unit and heating unit so that a liquid feed step of feeding a predetermined amount of slurry to said basket while rotating said basket, a liquid removal step of removing a liquid fraction contained in said slurry while rotating said basket, a cleaning step of feeding cleaning liquid to said basket to clean crystal while rotating said basket, a crystal scraping step of scraping off cleaned crystal while rotating said basket, a drying step of feeding heat to said basket to dry crystal while rotating said basket and a crustal recovery step of recovering dried crystal by means of said crystal recovery unit are carried out;

said basket being arranged so that a central axis thereof is inclined to orientate said bottom wall of said basket in an oblique and downward direction;

said crystal recovery unit including a crystal recovery suction pipe which includes a straight pipe section arranged so as to extend in parallel with said axis of said basket and rotatably supported while extending through said cover of said casing at a position deviated from said central axis of said basket and a pivotally movable section having a rearward end connected to an end of said straight pipe section defined on a side of said basket and a forward end orientated toward said peripheral wall of said basket and arranged so as to be pivotally moved with rotation of said straight pipe section and a suction pipe drive unit for rotating said straight pipe section of said crystal recovery suction pipe to pivotally move said pivotally movable section in said basket;

said crystal recovery suction pipe being so arranged that said pivotally movable section is displaced at said forward end thereof between a last suction position defined in proximity to a corner of said basket between a lowermost portion of said peripheral wall of said basket and said bottom wall of said basket and a retreat position at which said forward end is retreated inwardly of a position corresponding to an inner periphery of said end wall of said basket;

said control unit controlling said crystal recovering unit so as to displace said forward end of said pivotally movable section of said crystal recovery suction pipe to said last suction position during said crystal recovery step.

9. A centrifugal filtration apparatus as defined in claim 8, wherein said cover of said casing is mounted thereon with a lid plate;

said lid plate being arranged so as to be rendered opposite to said inner periphery of said end wall of said basket through a microgap defined therebetween to close an opening defined inside said end wall when said cover of said casing is at a closed position;

said bottom wall of said basket is formed with gas passage holes in a manner to extend therethrough and provided on an inside thereof with a filter so as to cover said gas passage holes; and said casing is provided with a pressure reducing unit connection to which a pressure reducing unit for reducing pressure in said casing is connected.

10. A centrifugal filtration apparatus comprising:

a casing including an openable cover and arranged so as to be tightly closed when said cover is closed;

a basket including a cylindrical peripheral wall formed with a plurality of through-holes, a bottom wall arranged so as to close one end of said peripheral wall defined in an axial direction thereof and an annular end wall arranged so as to be projected inwardly in a radial direction of said peripheral wall from an inner periphery of the other end of said peripheral wall defined in the axial direction;

said basket being arranged in said casing;

a revolving shaft arranged outside said basket so as to be coaxial with said basket and having one end coupled to an outer surface of said bottom wall of said basket;

said revolving shaft being rotatably supported by a bearing unit fixed with respect to said casing;

a rotation drive unit for rotating said revolving shaft;

a crystal recovery unit for recovering crystal in said basket;

a crystal scraping unit including a drive shaft inserted into said basket through said cover of said casing, a scraping blade mounted on said drive shaft and pivotally moved between an advance limit position at which it approaches said peripheral wall of said basket and a retreat position at which it is retreated inwardly of a position corresponding to an inner periphery of said end wall of said basket with rotation of said drive shaft and a scraping blade drive mechanism for driving said drive shaft to pivotally move said scraping blade;

a slurry feed unit for feeding slurry to said basket;

a cleaning liquid feed unit for feeding said basket with cleaning liquid for cleaning crystal formed in said basket;

a heating unit for feeding heat to said basket to dry crystal in said basket;

a control unit for controlling said rotation drive unit, crystal scraping unit, crystal recovery unit, slurry feed unit, cleaning liquid feed unit and heating unit so that a liquid feed step of feeding a predetermined amount of slurry to said basket while rotating said basket, a liquid removal step of removing a liquid fraction contained in said slurry while rotating said basket, a cleaning step of feeding cleaning liquid to said basket to clean crystal while rotating said basket, a drying step of scraping off cleaned crystal and feeding heat to said basket dry crystal while rotating said basket and a crystal recovery step of recovering dried crystal by means of said crystal recovery unit are carried out; and a basket inclination angle adjustment mechanism for adjusting an angle of inclination of a central axis of said basket with respect to a horizontal direction so as to incline said central axis of said basket by a predetermined angle with respect to the horizontal direction to orientate said bottom wall of said basket in an oblique and downward direction;

said crystal recovery unit including a crystal recovery suction pipe which includes a straight pipe section arranged so as to extend in parallel with said axis of said basket and rotatably supported while extending through said cover of said casing at a position deviated from said central axis of said basket and a pivotally movable section having a rearward end connected to an end of said straight pipe section defined on a side of said basket and a forward end orientated toward said peripheral wall of said basket and arranged so as to be pivotally moved with rotation of said straight pipe section and a section pipe drive unit for rotating said straight pipe section of said crystal recovery suction pipe to pivotally move said pivotally movable section in said basket;

said pivotally movable section of said crystal recovery suction pipe being arranged so that said forward end thereof is displaced between a last suction position defined in proximity to a corner of said basket between a lowermost portion of said peripheral wall of said basket and said bottom wall of said basket and a retreat position at which said forward end is retreated inwardly, of a position corresponding to an inner periphery of said end wall of said basket;

said cover of said casing being mounted thereon with a lid plate;

said lid plate being arranged so as to be rendered opposite to said inner periphery to said end wall of said basket through a microgap defined therebetween to close an opening defined inside said end wall when said cover of said casing is a closed position;

said bottom wall of said basket being formed with gas passage holes in a manner to extend there-through and provided on an inside thereof with a filter so as to cover said gas passage holes;

said casing being provided with a pressure reducing unit connection to which a pressure reducing unit for reducing a pressure in said casing is connected;

said control unit controlling said basket inclination angle adjustment mechanism so as to incline said central axis of said basket by a predetermined angle with respect to the horizontal direction to orientate said bottom wall of said basket in an oblique and downward direction and controlling said crystal recovery unit so as to displace the forward end of said pivotally movable section of said crystal recovery suction pipe to said last suction position.

* * * * *